(12) United States Patent
Kuwabara et al.

(10) Patent No.: US 10,854,084 B2
(45) Date of Patent: Dec. 1, 2020

(54) PARKING CONTROL METHOD AND PARKING CONTROL DEVICE

(71) Applicant: Nissan Motor Co., Ltd., Yokohama (JP)

(72) Inventors: Junichi Kuwabara, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/652,534

(22) PCT Filed: Oct. 5, 2017

(86) PCT No.: PCT/JP2017/036324
§ 371 (c)(1),
(2) Date: Mar. 31, 2020

(87) PCT Pub. No.: WO2019/069431
PCT Pub. Date: Apr. 11, 2019

(65) Prior Publication Data
US 2020/0242943 A1 Jul. 30, 2020

(51) Int. Cl.
*B60Q 1/48* (2006.01)
*G08G 1/16* (2006.01)
(Continued)

(52) U.S. Cl.
CPC ............ *G08G 1/168* (2013.01); *B60W 30/06* (2013.01); *G06K 9/00805* (2013.01);
(Continued)

(58) Field of Classification Search
CPC ........ G08G 1/168; G08G 1/143; G08G 1/146; G06K 9/00812; G06K 9/00805;
(Continued)

(56) References Cited

U.S. PATENT DOCUMENTS 10,737,689 B2 * 8/2020 Kim .................... B60W 10/20
2015/0039173 A1 2/2015 Beaurepaire et al.
(Continued)

FOREIGN PATENT DOCUMENTS

DE 102015003964 A1 9/2016
JP 2008-074296 A 4/2008
(Continued)

*Primary Examiner* — Toan N Pham
(74) *Attorney, Agent, or Firm* — Young Basile Hanlon & MacFarlane, P.C.

(57) ABSTRACT

A parking control method causes a control device of a vehicle to execute a first control instruction on the basis of an operation command acquired from an operator. The first control instruction is for moving the vehicle along a first route to a target parking space. When there is a change in a parking environmental factor of the vehicle detected after the start of execution of the first control instruction with respect to the parking environmental factor of the vehicle detected prior to the start of execution of the first control instruction, an inquiry is made to the operator as to whether or not it is necessary to execute a second control instruction for the vehicle to leave from the target parking space.

11 Claims, 19 Drawing Sheets

(51) Int. Cl.
  *B60W 30/06*    (2006.01)
  *G06K 9/00*     (2006.01)
  *G08G 1/14*     (2006.01)

(52) U.S. Cl.
  CPC ......... *G06K 9/00812* (2013.01); *G08G 1/143* (2013.01); *G08G 1/146* (2013.01); *B60W 2556/50* (2020.02)

(58) Field of Classification Search
  CPC ...... B60W 30/06; B60W 30/08; B60W 50/14; G05D 1/00; G05D 1/0011; G05D 1/0033; B62D 15/028
  See application file for complete search history.

(56) References Cited

U.S. PATENT DOCUMENTS

2017/0259850 A1* 9/2017 Yamashita ........... B62D 15/028
2018/0308359 A1  10/2018 Hayakawa

FOREIGN PATENT DOCUMENTS

JP    2014-054912 A    3/2014
JP    2017-067466 A    4/2017
WO    2017/068695 A1   4/2017

* cited by examiner

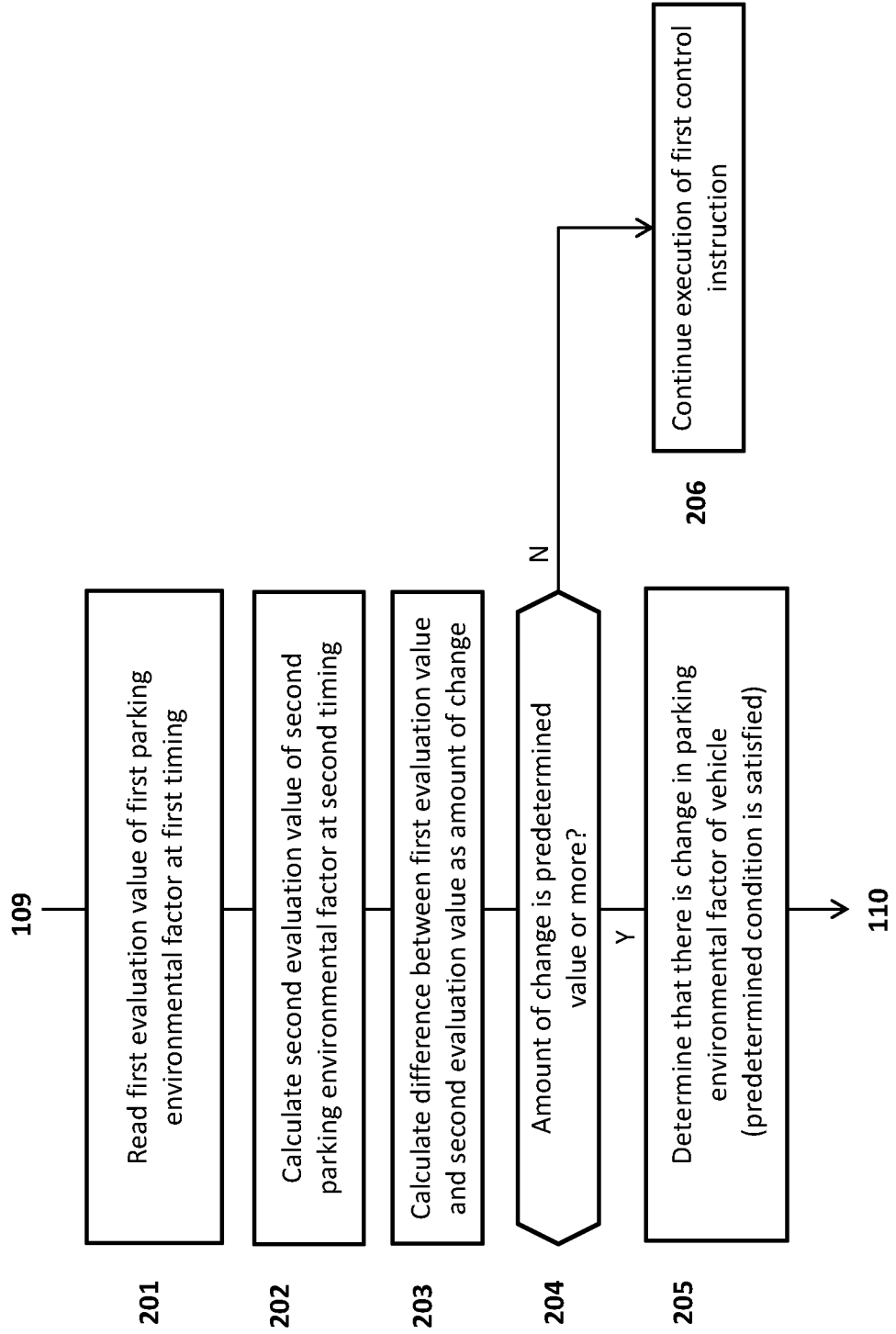

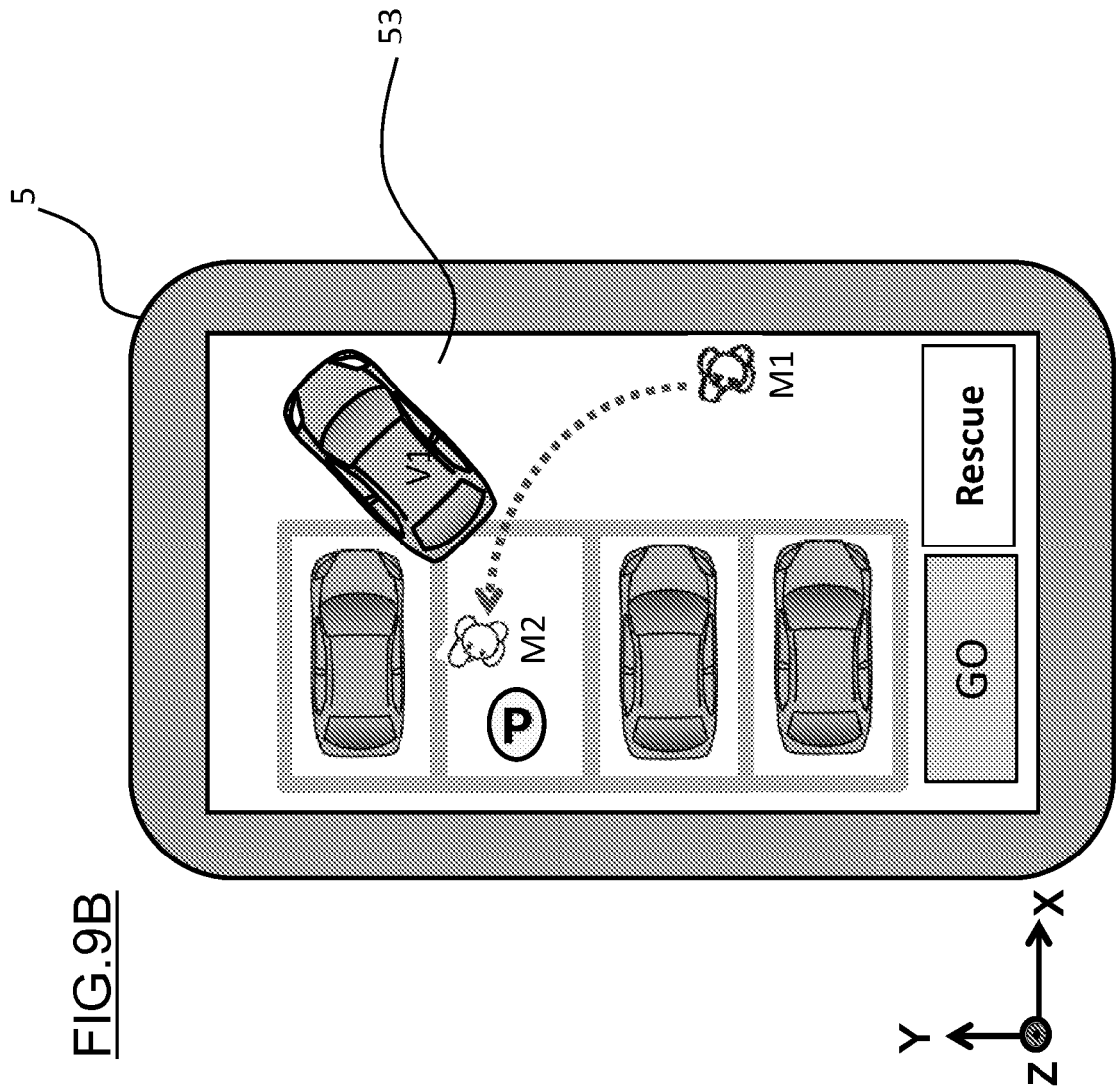

PARKING CONTROL METHOD AND PARKING CONTROL DEVICE

TECHNICAL FIELD

The present invention relates to a parking control method and a parking control apparatus.

BACKGROUND

A technique is known in which when a vehicle is parked into a parking space by being operated from outside of the vehicle, the vehicle is controlled to make a stop if an object is detected around the vehicle (JP2008-074296A).

SUMMARY

In the above prior art, the vehicle is controlled to make a stop even when an object that does not actually obstruct the movement of the vehicle is detected, and the operator therefore has to repeat the operation to park the vehicle.

A problem to be solved by the present invention is to avoid unexceptionally/uniformly stopping a vehicle when detecting a change in a parking environmental factor around the vehicle, such as detection of an object.

The present invention solves the above problem through, when there is a change in an parking environmental factor of a vehicle detected after start of execution of a first control instruction with respect to the parking environmental factor of the vehicle detected prior to the start of execution of the first control instruction, making an inquiry to an operator as to whether or not it is necessary to execute second control for the vehicle to leave from a target parking space (for making the vehicle leave from a target parking space).

According to the present invention, when a change in the parking environmental factor, such as detection of an object, is detected around the vehicle, an inquiry is made to the operator as to whether or not it is necessary to execute the second control for the vehicle to leave from the target parking space without unexceptionally/uniformly stopping the vehicle and, therefore, transition to the second control can be promptly executed in response to the change in the parking environmental factor.

BRIEF DESCRIPTION OF THE DRAWINGS

FIG. 5 is a flowchart illustrating a subroutine of a process of determining whether or not there is a change in a parking environmental factor;

FIG. 9B is a diagram illustrating an example of fourth display information on a terminal device when executing second control;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
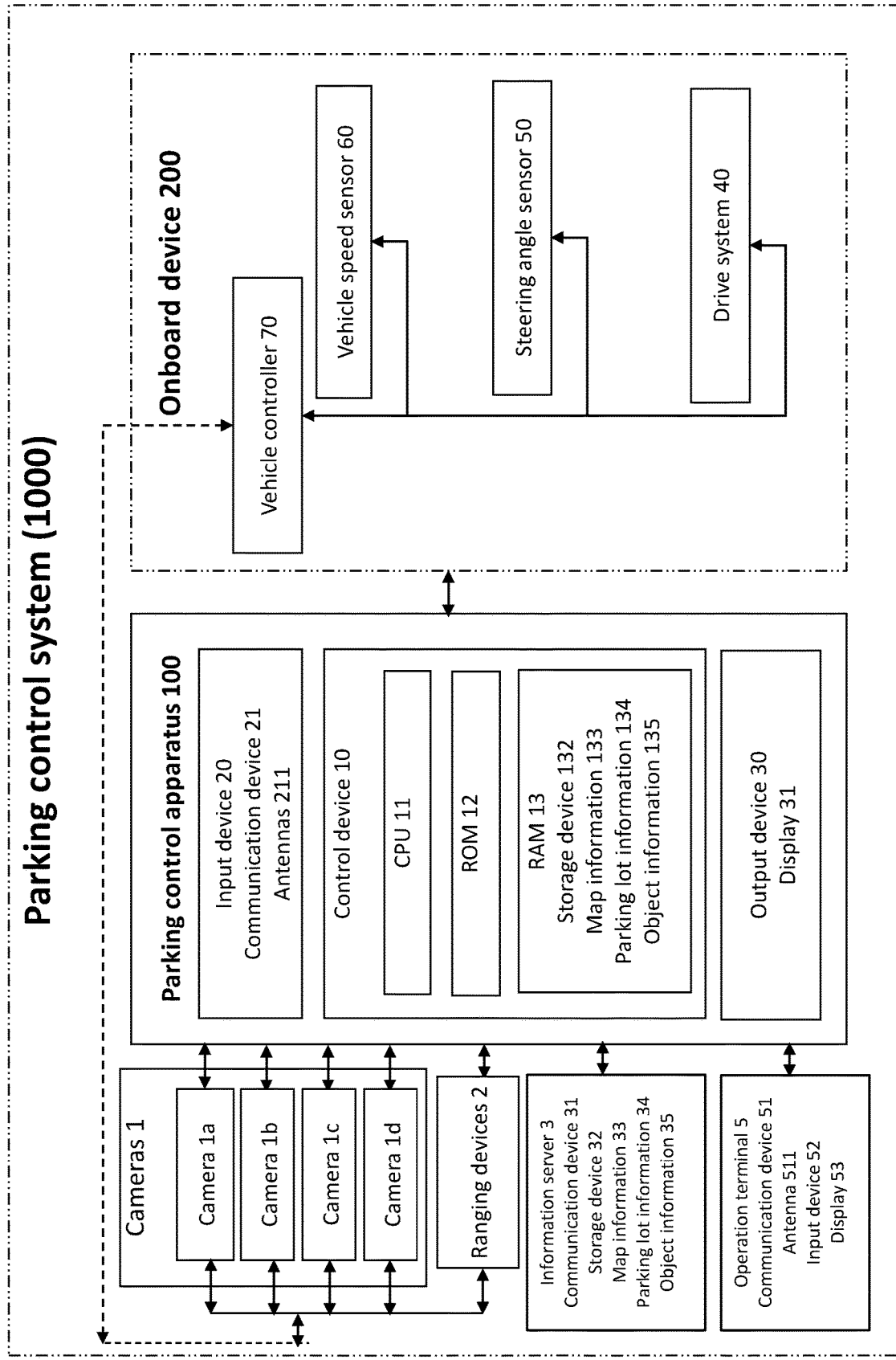
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60.

The parking control apparatus 100 according to one or more embodiments of the present invention causes a control device (ECU: Engine Control Unit) of a vehicle to execute a first control instruction (parking control instruction) for moving the vehicle as the target of control along a first route to a target parking space (parking lot), on the basis of an operation command acquired from an operator. The parking control apparatus 100 according to one or more embodiments of the present invention controls the operation of moving (parking) a vehicle V as the target of control into a target parking space on the basis of an operation command that is input from the operation terminal 5. The parking control apparatus 100 according to one or more embodiments of the present invention controls the operation of moving the vehicle V so as to make the vehicle V leave from the target parking space, (so as to separate the vehicle V from the target parking space), (so that the vehicle V is/becomes distant from the target parking space), (so that the vehicle V escapes from the target parking space), on the basis of an operation command that is input to the operation terminal 5 by an operator M located outside the vehicle. One or more embodiments of the present invention will be described with reference to an exemplary case in which the operator M is located outside the vehicle, but the operator M may be located inside the vehicle interior of the vehicle V1. In another case, occupants including the driver may be located inside the vehicle interior while the operator M (such as a manager of the parking lot) may be located outside the vehicle.

The operation terminal 5 is a portable computer that can be brought out to outside of the vehicle V and has an input function and a communication function. The operation terminal 5 receives the input of an operation command made by an operator M for controlling the driving (operation) of the vehicle V for parking. The driving includes operations for parking (operations for entering a parking space and exiting the parking space). The operator M inputs instructions via the operation terminal 5. The instructions include an operation command for execution of parking. The operation command includes information on the execution/stop of parking control, selection/change of a target parking position, and selection/change of a parking route and other information necessary for parking. The operator M can also make the parking control apparatus 100 recognize the instructions including the operation command without using the operation terminal 5, such as a gesture made by the operator M (i.e., the operator M can input such instructions to the parking control apparatus 100 without using the operation terminal 5, such as by a gesture). Examples of operation commands that are input by the operator M via the operation terminal 5 include not only the operation command for executing the parking but also an evacuation command for the vehicle to leave from the target parking space.

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server 3 includes a communication device 31 and a storage device 32. The storage device 32 includes readable map information 33, parking lot information 34, and object information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle V is controlled on the basis of the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention includes execution instructions for causing the control device 10 to execute some processes on the basis of the operation command acquired from the operator. These process include a process of causing a vehicle controller 70 to execute the first control instruction for moving the vehicle along the first route to a target parking space; a process of determining a change in a parking environmental factor (process of evaluating an amount of change in the parking environmental factor); and when there is a change in the parking environmental factor, making an inquiry to the operator as to whether or not it is necessary to execute second control for the vehicle to leave from the target parking space.

The parking control program according to one or more embodiments of the present invention may include execution instructions for suspending or canceling execution of the first control instruction when an execution command for the second control is input from the operator; calculating a second route for the vehicle to leave from the target parking space; generating or acquiring a second control instruction for moving the vehicle along the second route; and causing the control device to execute the second control instruction.

The parking control apparatus 100 according to one or more embodiments of the present invention is a remote control-type apparatus that receives the operation command from the operation terminal 5 and controls the movement of the vehicle V to park the vehicle V into a given parking space. The occupant who operates the operation terminal 5 may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous (automated) manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking position, or the parking control apparatus 100 or the parking facility side may automatically set the target parking position.

The control device 10 of the parking control apparatus 100 according to one or more embodiments of the present invention has functions of executing a first control process of moving the vehicle along the first route to the target parking space; a process of detecting a change in the parking environmental factor of the vehicle; a process of determining a change in the parking environmental factor (process of evaluating an amount of change in the parking environmental factor); and when there is a change in the parking environmental factor, making an inquiry to the operator as to whether or not it is necessary to execute the second control for the vehicle to leave from the target parking space.

The control device 10 has functions of executing a process of suspending or canceling execution of the first control instruction when an execution command for the second control is input from the operator; a process of calculating a second route for the vehicle to leave from the target parking space; a process of generating or acquiring a second control instruction for moving the vehicle along the second route; and a process of causing the control device to execute the second control instruction. Each of the above processes is executed by cooperation of software for implementing the process and the above-described hardware.

Some processes of detecting the position of the operator M will be described with reference to FIGS. 2A to 2D. The control device 10 acquires the position of the operator M. The position of the operator M is used for calculation of an evacuation space. The position of the operator M includes information on the position on the movement plane of the vehicle V. The position of the operator M includes information on the height position. The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M.

Figure 2A:
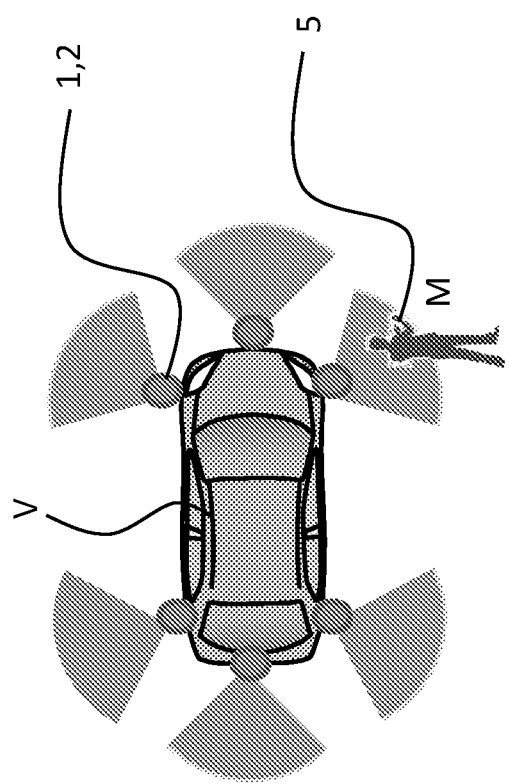
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with features of the image of the gesture.

Figure 2B:
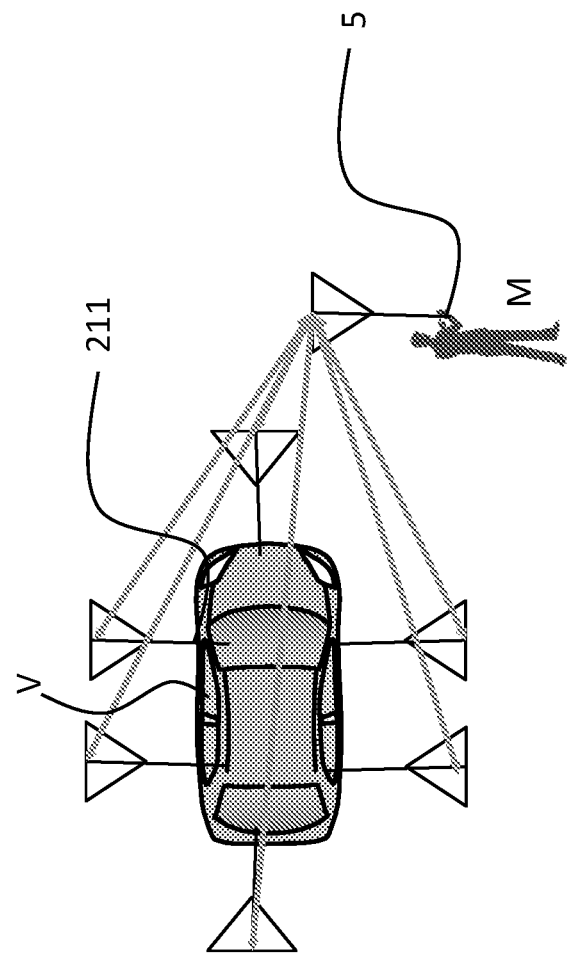
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
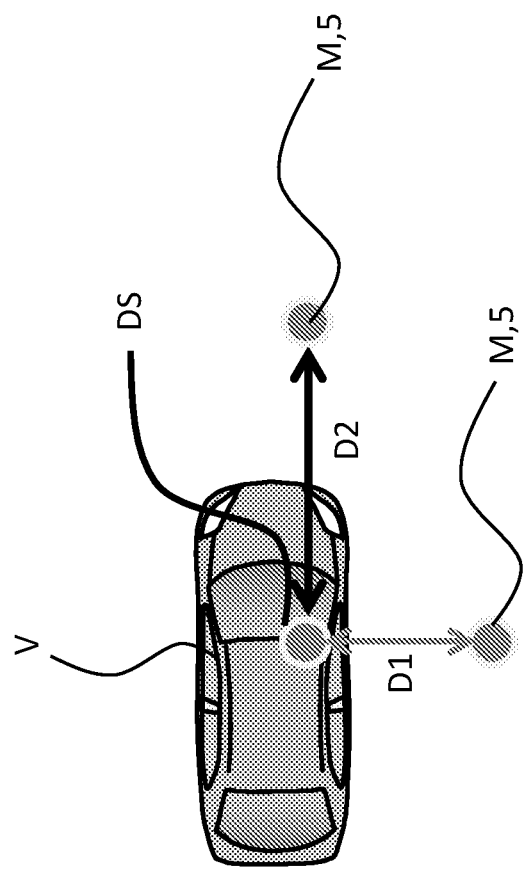
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to calculate the initial position of the operator M with respect to the vehicle V or the initial position of the terminal 5, which is carried by the operator M, with respect to the vehicle V.

Figure 2D:
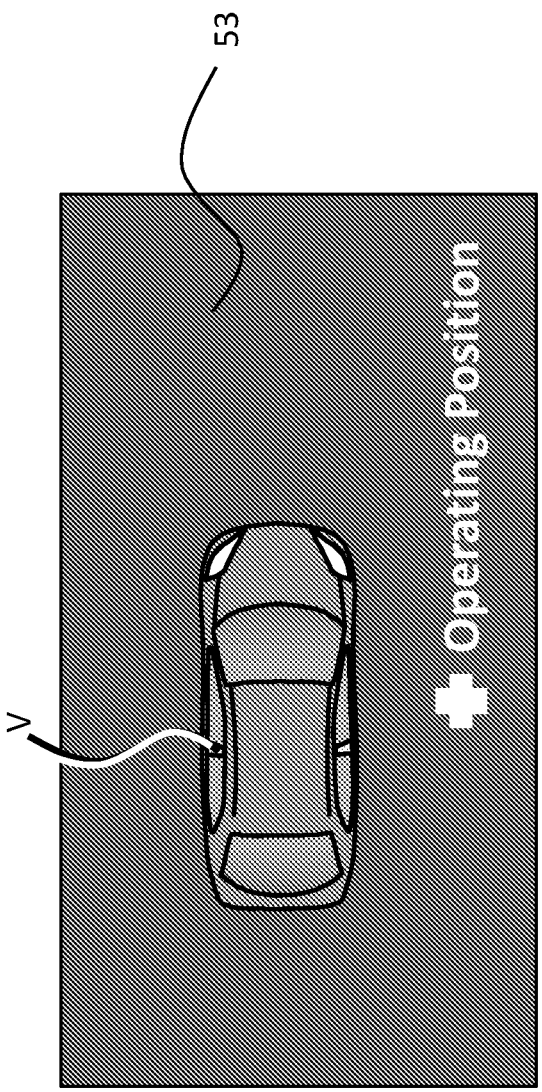
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

The detection process for an object will be described with reference to FIGS. 3A and 3B. In one or more embodiments of the present invention, "objects" include structures, such as walls and pillars of a parking lot, installations around the vehicle, pedestrians, other vehicles, parked vehicles, etc.

Figure 3A:
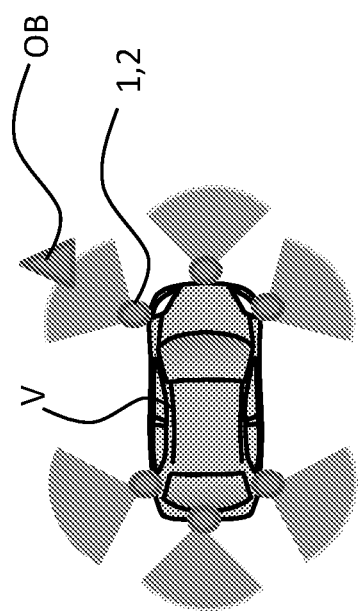
FIG. 3A is a diagram for describing a first detection scheme for an object.

As illustrated in FIG. 3A, an object is detected on the basis of the detection results from the multiple ranging devices 2 provided in the vehicle V and/or the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1a to 1d. The detection of an object may be performed using a motion stereo technique with the cameras 1a to 1d. The detection results are used to determine whether or not a parking space is empty (whether or not a vehicle is parked in the parking space).

Figure 3B:
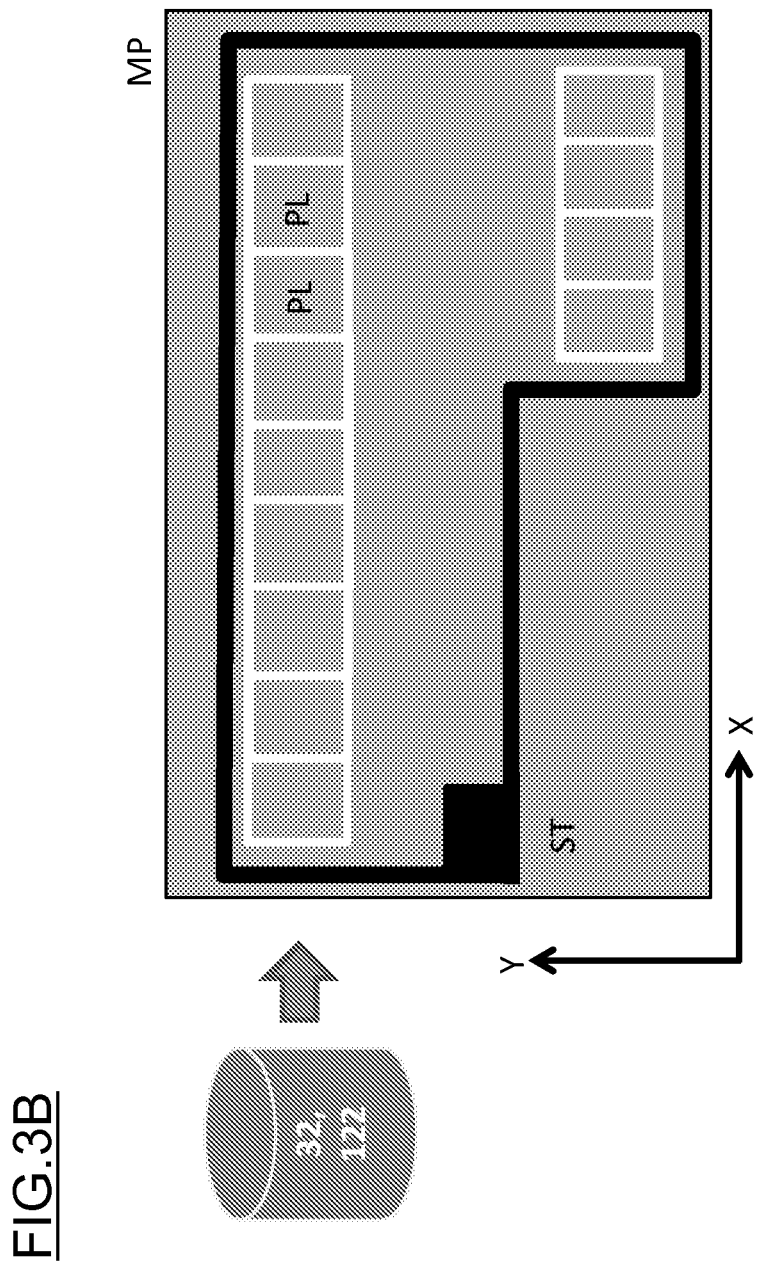
FIG. 3B is a diagram for describing a second detection scheme for an object.

As illustrated in FIG. 3B, objects including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

The control procedure of parking control will be described below with reference to the flowchart illustrated in FIG. 4.

Figure 4:
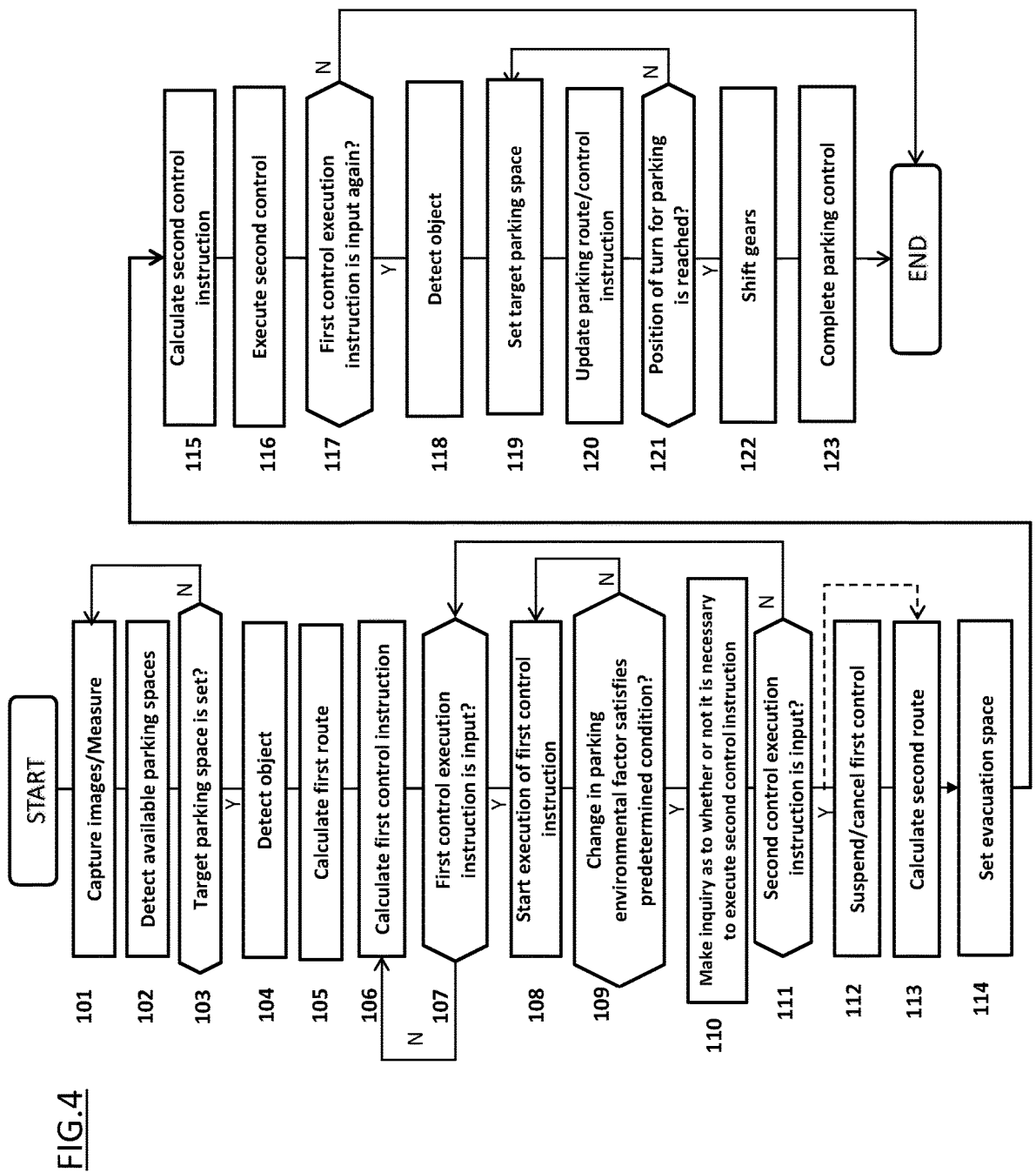
FIG. 4 is a flowchart illustrating an example of a control procedure executed by the parking control system according to one or more embodiments of the present invention.

FIG. 4 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 acquires information around the vehicle at a predetermined cycle. The information around the vehicle is information of a parking environmental factor of the vehicle V, which will be described later. The process of acquiring the ranging signals and the process of acquiring the captured images may be selectively executed. The control device 10 acquires the ranging signals, as necessary, from the ranging devices 2 which are attached to multiple sites of the vehicle V. The control device 10 acquires the images, as necessary, which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. A camera having a wide-angle lens with a wide view angle can be used as each of the cameras 1a to 1d. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. Data of the position, size, or the like of a parking space is information of a parking environmental factor of the vehicle V, which will be described later. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects available parking spaces from among the parking spaces. The available parking spaces are parking spaces which are empty (i.e., other vehicles are not parked) and to which routes for completing the parking can be calculated. The target parking space for parking the vehicle is specified from among the available parking spaces. In one or more embodiments of the present invention, the condition that a parking route can be calculated means that a trajectory of the route from the current position to a target parking position can be rendered on the road surface coordinates without interfering with objects (including parked vehicles).

In step 103, the control device 10 transmits the available parking spaces to the operation terminal 5, controls the display 53 to display the available parking spaces, and requests the operator M to input selection information of the target parking position for parking the vehicle V. The target parking position may be automatically selected by the control device 10 or the parking facility side. When the operation command of specifying a parking space is input to the operation terminal 5, the parking space is set as the target parking position.

In step 104, the control device 10 detects an object using the previously described scheme. Objects include pedestrians, traffic signs, road structures, cargoes, movable objects, structures that form parking spaces, curbstones that partition parking spaces, etc. Structures that form parking spaces are buildings that constitute garages, carports, and the like. The detection of objects includes the detection of obstacles that obstruct the execution of the parking control. These are each a parking environmental factor of the vehicle V, which will be described later.

In step 105, the control device 10 calculates a first route to the target parking space on the basis of the parking environmental factor of the vehicle V. Any scheme known at the time of filing the present application may be used for the process of calculating the first route to the target parking space.

In step 106, the control device 10 generates a first control instruction for moving the vehicle V along the calculated first route. The control device 10 preliminarily stores the spec information of the vehicle V necessary for the control instruction. Examples of the first control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The first control instruction includes the execution timing or execution position of the above operation instruction for the vehicle V. The instruction regarding the parking route and the operation instruction associated with the parking route are executed by the vehicle V, and the vehicle V can thereby be moved (parked) to the target parking position.

In step 107, the control device 10 receives an input of an execution instruction of the first control instruction from the operator M. When the execution instruction is input, the process proceeds to step 108, in which execution of the first control instruction is started. The execution instruction may be an input to a deadman switch of the operation terminal 5. The deadman switch is a switch having a function of continuing execution of the parking control process only while the operator applies force to the switch and a function of suspending or canceling the execution of the parking control process when the force applied to the switch is removed. While the deadman switch of the operation terminal 5 is pressed, the parking control process is continuously executed.

In step 109, the control device 10 detects a change in the parking environmental factor of the vehicle V1 detected after the start of execution of the first control instruction with respect to the parking environmental factor of the vehicle V1 detected prior to the start of execution of the first control instruction. Even after the parking control (first control) for the vehicle V1 is started, the detection result of an object and the detection result of a parking space change every moment. A pedestrian (object) may newly appear with the passage of time, an object that was not able to be detected can be detected due to a change in the position of the vehicle V1, or the position and/or size of a parking space may change.

For example, a bumper or the like of another vehicle parked is formed with a curved surface; therefore, reflected waves from the other vehicle irradiated with radar cannot be detected during approach to the other vehicle, and the presence of the other vehicle may not be detected. After the turn for parking, however, the positional relationship between the other vehicle and the subject vehicle changes, so it may be possible to receive the reflected waves from the other vehicle irradiated with radar and detect the presence of the other vehicle. That is, when the vehicle V1 is controlled to move straight ahead along a parking route for right-angle parking and then turn for parking and travel along the parking route (first route) for entering the parking space while moving back, a determination will be made that "another vehicle is present," at the position of turn for parking or at the time of moving back even though a determination has been made that "another vehicle is not present" at the time of starting the parking control or moving straight ahead. In such a case, a determination is made that the parking environmental factor has changed.

The parking environmental factor refers to an environmental factor around the vehicle to be parked (vehicle to be controlled) that affects whether or not the execution of the parking control is possible. Environmental factors that affect the parking control include the presence/absence/position of another vehicle around the vehicle to be parked, the position/size of a parking space, and other similar factors. Examples of the change in the parking environmental factor include a situation in which an object has been newly detected, a change in the position, shape, size, or attribute of an object that has been detected, and a change in the position, shape, size, height, or attribute of a parking space that has been detected. The attributes of a parking space include parking forms/types such as parallel parking, right-angle parking, and angled-parking. The attributes of an object include a determination as to whether the object is a stationary object, the object is a moving object, the object is a pedestrian, the object is an adult, the object is a child, the object is garbage, the object is a road structure, or the object is a natural object. Road structures include traffic signs.

Although not particularly limited, the change in the parking environmental factor is a result of the comparison between a first parking environmental factor at first timing as a reference and a second parking environmental factor at second timing after the first timing. The first timing may be timing when the execution of the first control instruction is started (including the timing immediately before or after the start). Alternatively, the first timing may be timing when the parking environmental factor used for calculating the first route is acquired. Specifically, upon the comparison between the first parking environmental factor of the vehicle detected before the start of execution of the first control instruction and the second parking environmental factor of the vehicle detected after the start of execution of the first control instruction, when the amount of change between a first evaluation value of the first parking environmental factor and a second evaluation value of the second parking environmental factor is not less than a predetermined value, the control device 10 determines that there is a change in the parking environmental factor.

By quantitatively determining whether or not there is a change in the parking environmental factor on the basis of the amount of change between the first evaluation value of the first parking environmental factor and the second evaluation value of the second parking environmental factor, the timing of an inquiry about the execution of the second control can be determined accurately and appropriately.

The evaluation that an object has been newly detected is performed as follows. The control device 10 may determine whether or not there is a change in the parking environmental factor, on the basis of whether or not a predetermined certain condition is satisfied. The first evaluation value that an object is not detected at the first timing is defined as "zero" while the second evaluation value that an object is detected at the second timing is defined as "1," and the difference value between the evaluation values is employed as an amount of change in the evaluation value. The control device 10 defines the predetermined condition as the amount of change being equal to or more than a predetermined value "1" and determines that the parking environmental factor satisfies the predetermined condition on the basis of the difference value between the evaluation values being "1."

The evaluation of a change in the detection result represented by a physical amount such as a coordinate or a length is performed as follows. For a change in the position, shape, or size of an object that has been detected, the control device 10 calculates the amount of change in the evaluation value on the basis of the detected physical amount. The same applies to a change in the position, shape, or size of a parking space.

The evaluation of determination of an attribute based on the detection result is performed as follows. The attribute is determined on the basis of images captured by the cameras 1a to 1d. On the basis of the amount of a temporal change in the captured images, a determination is made as to whether the object is a stationary object or a moving object. The pattern matching of an object extracted from the captured images can be conducted to determine whether the object is a pedestrian, the object is garbage, or the object is a road structure. Whether the object is an adult pedestrian or the object is a child pedestrian can be determined on the basis of the pattern matching and size of the object extracted from the captured images.

The "attributes" of an object OB include being an "obstacle" that obstructs the movement of the vehicle and being a "non-obstacle" that does not obstruct the movement of the vehicle. The "non-obstacle" is an object that does not obstruct the travel of the vehicle V, such as a moving object, an object having a height of 20 cm or less, an object having a height of 10 cm or less, garbage, a step having a level difference of 20 cm or less, a step having a level difference of 10 cm or less, a fallen leaf, or grass.

A moving object becomes absent on the first route over time and thus does not obstruct the movement of the vehicle V1. An object having a height of 20 cm or less, an object having a height of 10 cm or less, a step having a level difference of 20 cm or less, a step having a level difference of 10 cm or less, garbage, fallen leaves, grass, and the like also do not obstruct the movement of the vehicle V1. The height and size of an object can be determined on the basis of the captured images and the measurement results from the ranging devices 2. A shopping bag of polyethylene or the like provided in a supermarket or the like has an upper limit (e.g., about 40 cm×40 cm) in size and may move in various directions due to wind or the like. Although fallen leaves, grass, and the like are natural objects, their presence can be determined on the basis of features on an image or changes over time of the features, such as a color, a gathering form, and movement in different directions due to wind or the like.

Evaluation of attribute changes based on the detection results is performed as follows. The control device 10 gives an evaluation value associated with the attribute. The attribute is determined on the basis of the difference between numerical values defined for each attribute or the difference between the absolute values.

FIG. 5 illustrates a subroutine of step 109 of FIG. 4. The process illustrated in FIG. 5 allows the control device 10 to perform a process of determining whether or not there is a change in the parking environmental factor. Whether or not there is a change in the parking environmental factor may be determined on the basis of whether or not a predetermined condition is satisfied. The predetermined condition is defined from the viewpoint of determining that the state in which the parking control (first control) can be continued is maintained or the state in which the continuation should be reviewed. When the predetermined condition is satisfied, the continuation of the parking control (first control) is reviewed, and the activation of a rescue mode (second control) is taken into account. On the other hand, when the predetermined condition is not satisfied, there is no change in the parking environmental factor, and the execution of the parking control (first control) is continued.

In step 201, the control device 10 reads the first evaluation value of the first parking environmental factor at the first timing after the start of execution of the first control instruction. The past detection results are stored in the storage device 132 as the object information 135.

In step 202, the control device 10 calculates the second evaluation value of the second parking environmental factor at the second timing after the first timing on the basis of the images captured by the cameras 1 and the measurement values from the ranging devices 2.

In step 203, the control device 10 calculates a difference between the first evaluation value and the second evaluation value as an amount of change.

In step 204, the control device 10 determines whether or not the amount of change calculated in step 203 is equal to or more than a predetermined value.

When, in step 204, the amount of change is equal to or more than the predetermined value, the control device 10 determines in step S205 that there is a change in the parking environmental factor, and the process proceeds to step 110 of FIG. 4. When the amount of change is equal to or more than the predetermined value, a determination may be made that a predetermined certain condition is satisfied. This is a state in which the change in the parking environmental factor is large and the continuation of the parking control should be taken into account. When, in step S204, the amount of change is less than the predetermined value, the control device 10 determines that there is no change in the parking environmental factor, and the process proceeds to step 206, in which the first control (parking control) is continued.

In step 110 of FIG. 4, the control device 10 makes an inquiry to the operator M as to whether or not it is necessary to execute the second control instruction for the vehicle V1 to leave from the target parking space PL. When there is a change in the parking environmental factor, the control device 10 controls the operation terminal 5 to present a display to inquire about an input of the execution command for the second control instruction.

Figure 6A:
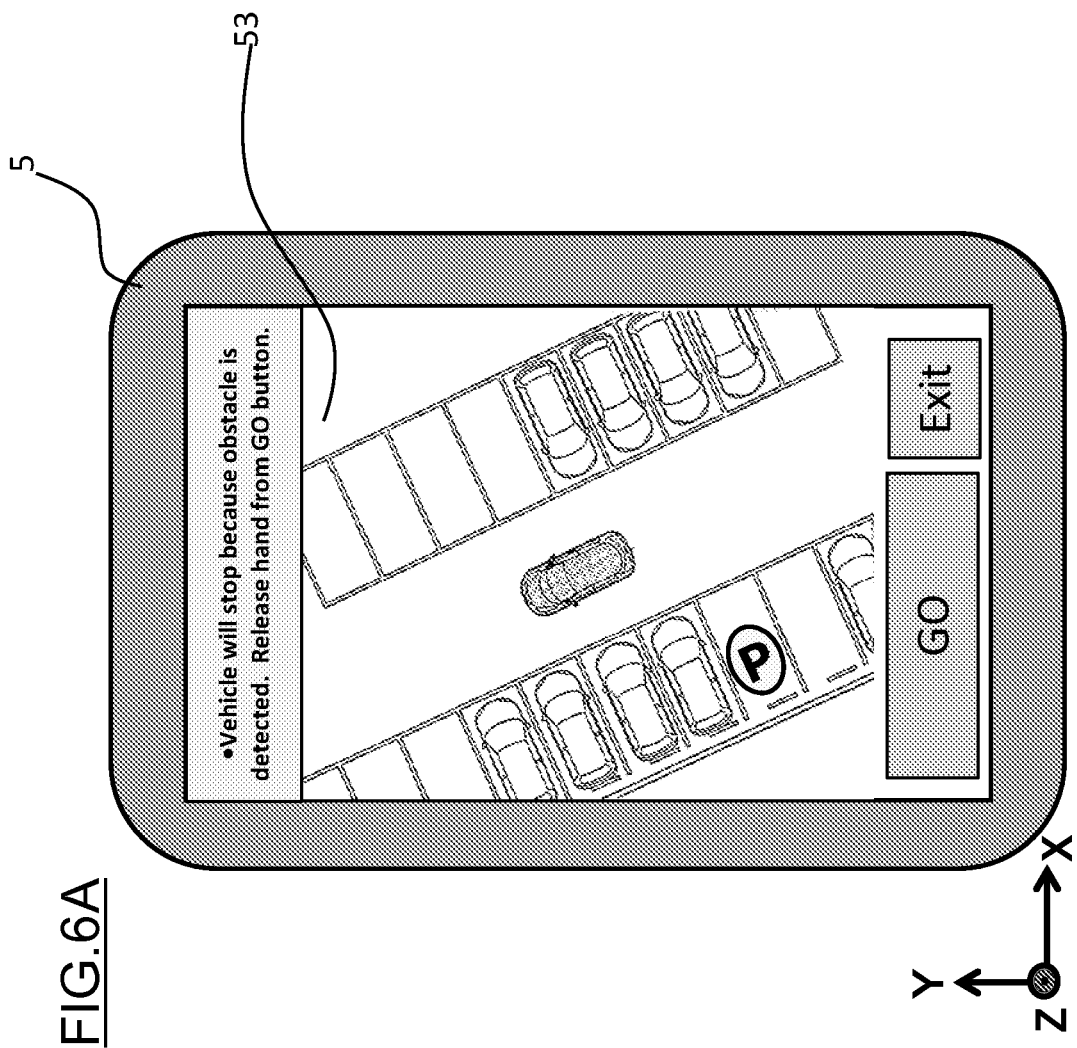
FIG. 6A is a diagram illustrating an example of first display information on a terminal device when executing first control.
Figure 6B:
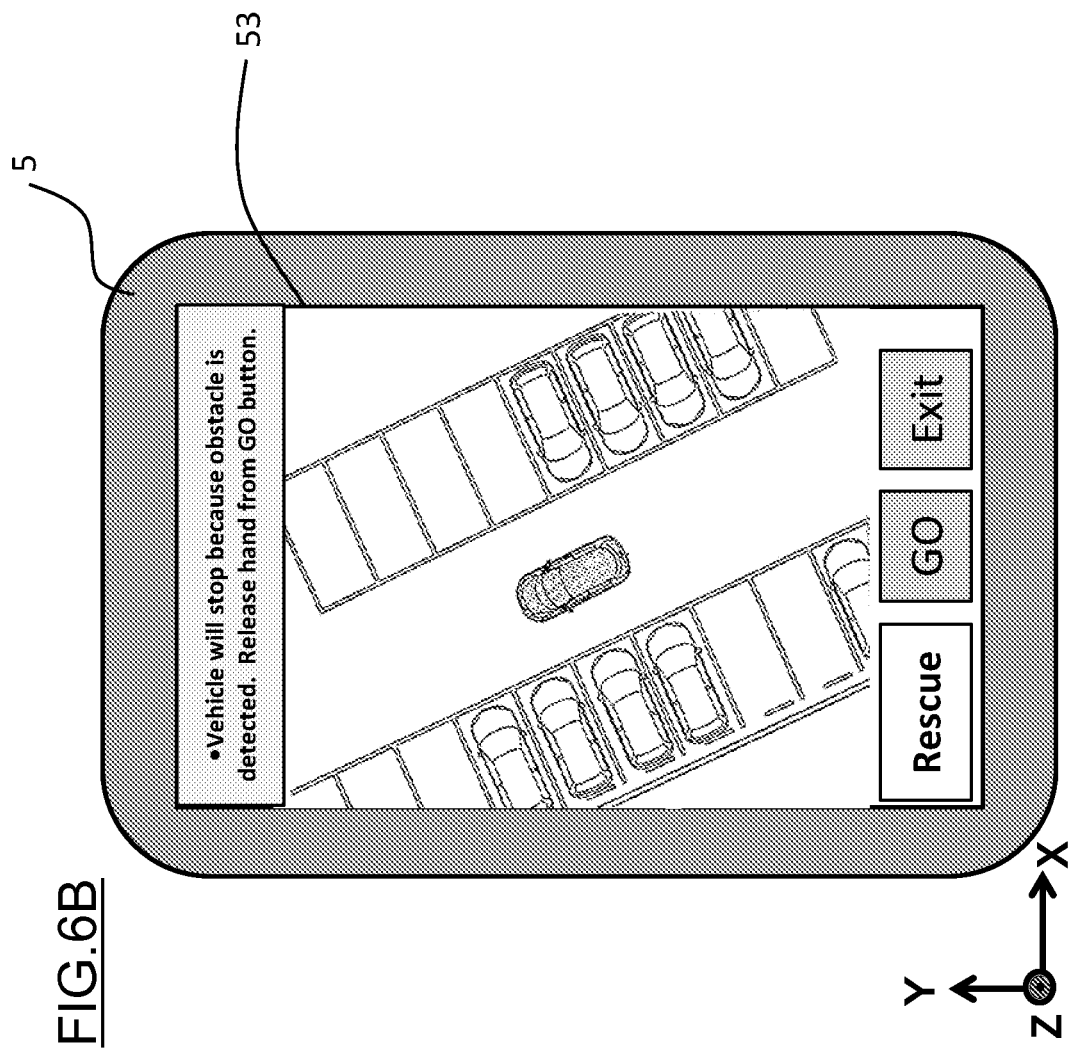
FIG. 6B is a diagram illustrating an example of first display information on a terminal device when executing second control.

FIGS. 6A and 6B are display examples on the display 53 of the operation terminal 5. As illustrated in FIGS. 6A and 6B, appearances of the vehicle V1 before parking, other vehicles V2 parked around the vehicle V1, the target parking space for the vehicle V1, and an object OB that is present on the route to the target parking space (i.e., an object OB to which attention should be paid) are presented after coordinate conversion as viewed from above. This display form also applies to FIGS. 7A and 7B to FIGS. 10A and 10B, which will be described later.

FIG. 6A illustrates an example of presentation information for inputting an execution command for the first control (parking control). FIG. 6B illustrates an example of presentation information for inputting an execution instruction for the second control (rescue mode control). The operator M operates the presentation image as an interface to enter the execution of the first control. When the first control (parking control) is executed, the operator M presses or touches a "GO" button. The "GO" button is an input button of the previously described deadman switch, and the execution of the first control is continued while the button is being pressed.

FIG. 6B is an example of presentation information for making an inquiry to the operator M as to whether or not it is necessary to execute the second control, which is to make the vehicle V1 leave from the target parking space, and for receiving an input of the execution instruction from the operator. When the first control is performed for the vehicle V1, the object OB is present in the vicinity of the point of turn for parking, so the first control is suspended. In this case, the control device 10 displays a "Rescue" button for making an inquiry to the operator M about execution of the second control. When an acceptance input is made via the "Rescue" button, the control device 10 executes the second control instruction. In this example, the name of the second control for the vehicle V1 to leave from the target parking space is referred to as a "Rescue" mode, but the name is not particularly limited.

When a determination is made that there is a change in the parking environmental factor, the display inquiring about an input of the execution command for the second control instruction is presented on the operation terminal 5 capable of communication, and it is therefore possible to promptly confirm the intention of the operator M regarding the switching to the second control for leaving from the target parking space and also promptly execute the second control.

Four examples of specific schemes for determining whether or not there is a change in the parking environmental factor of the vehicle and presentation information for inquiring as to whether or not it is necessary to execute the second control instruction will be described below.

(1) First, the criterion for the control device 10 to determine that there is a change in the parking environmental factor can be defined by a situation in which "an object is detected on the first route after the start of execution of the first control instruction."

Figure 7A:
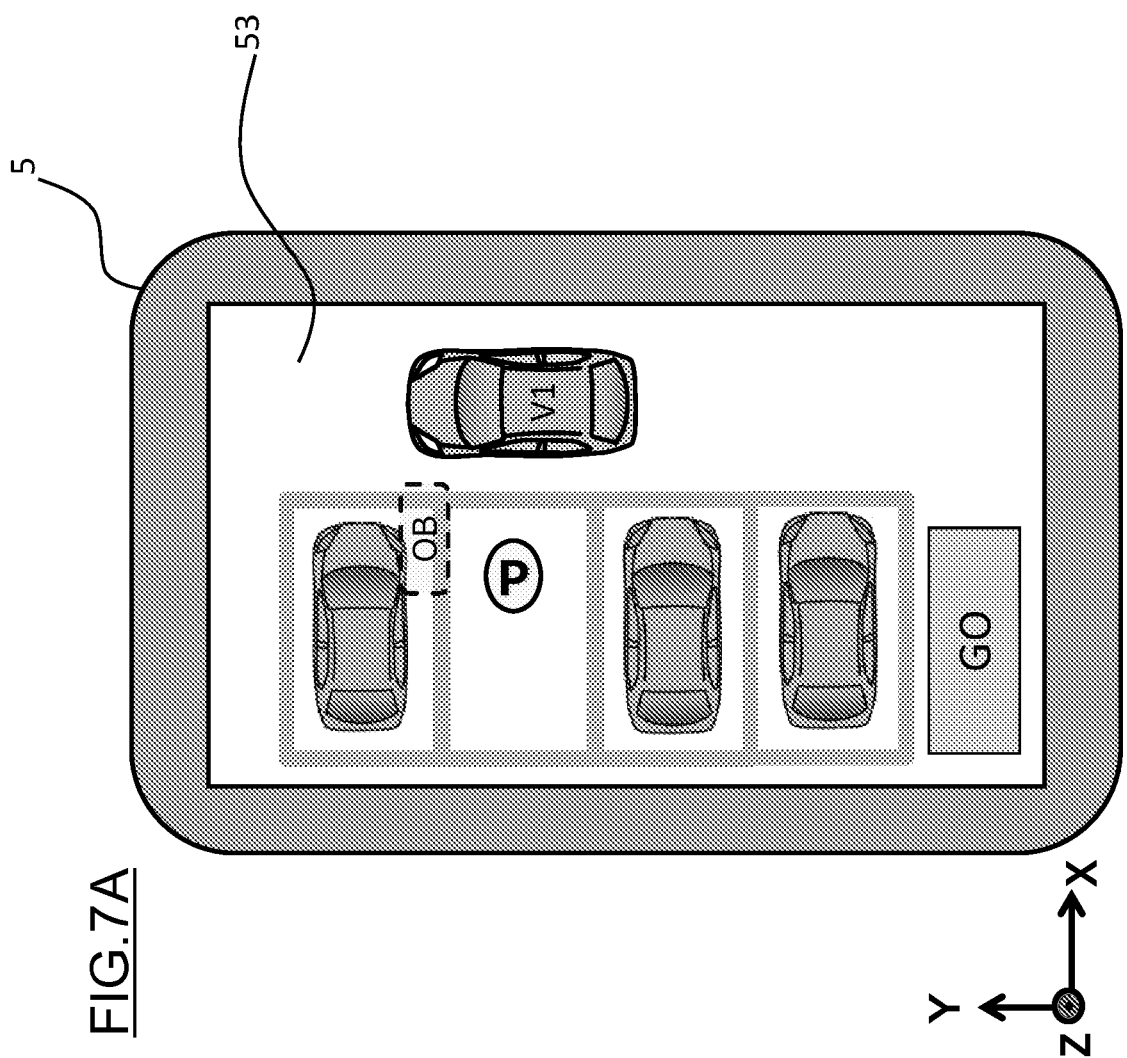
FIG. 7A is a diagram illustrating an example of second display information on a terminal device when executing first control.
Figure 7B:
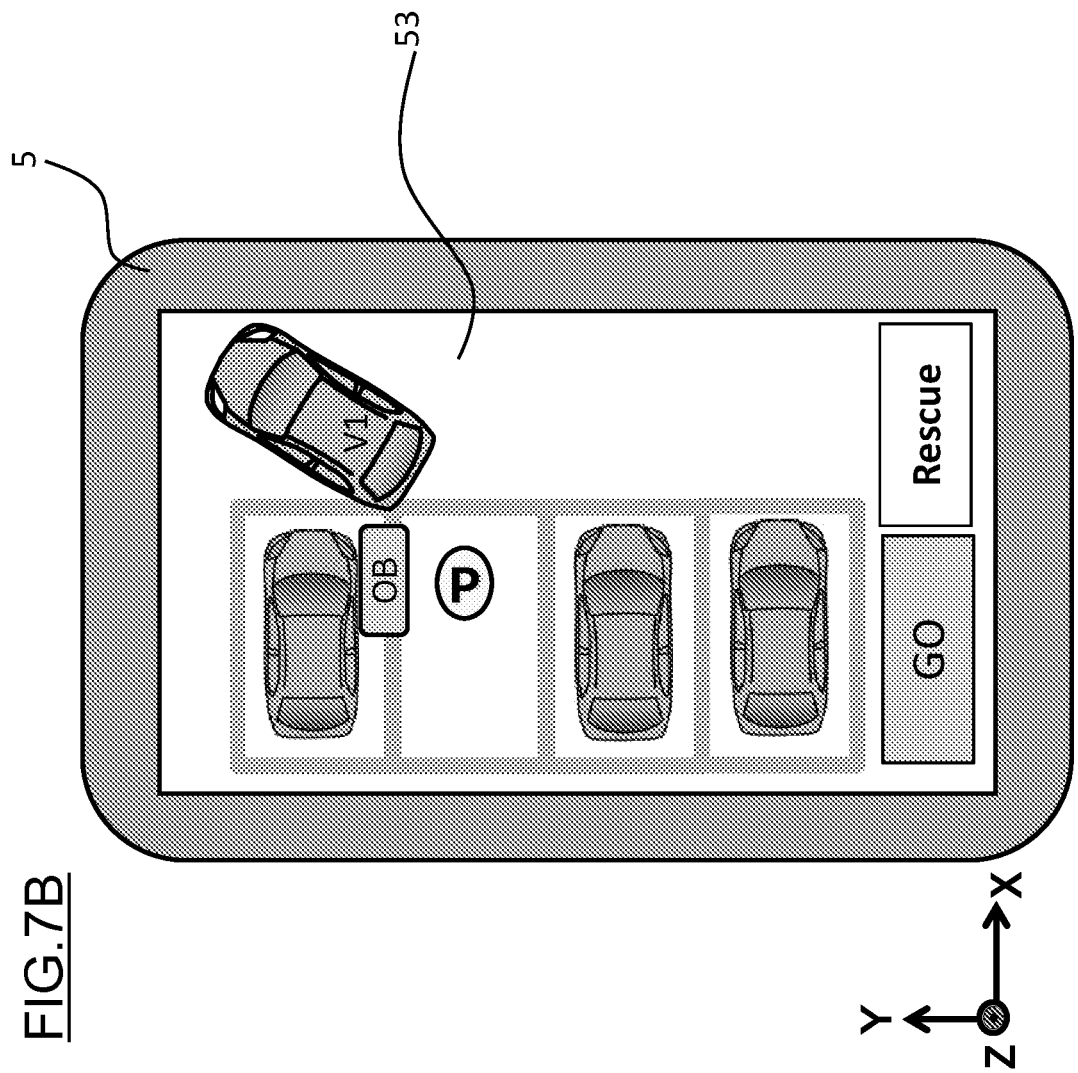
FIG. 7B is a diagram illustrating an example of second display information on a terminal device when executing second control.

FIG. 7A illustrates an example of the presentation information based on the detection result at the first timing when the first control is started. For descriptive purposes, it is assumed that an object OB indicated by the broken line in FIG. 7A has not been detected at the first timing. The control device 10 detects the object OB as a new object at the second timing after the first timing. The control device 10 determines that the object OB is located on the first route in the first control instruction and also determines that there is a change in the parking environmental factor. The control device 10 controls the display 53 of the operation terminal 5 to present the presentation information of FIG. 7B. The presentation information illustrated in FIG. 7B includes the object OB detected at the second timing and also includes a "Rescue" button for making an inquiry to the operator M as to whether or not it is necessary to execute the second control. Examples of the "new object" include a moving object. From the viewpoint of eliminating a situation in which a determination is made that "there is a change in the parking environmental factor" on the basis of the detection of a moving object that passes in a short time, a moving object detected when the speed (amount of change in the position) of the moving object is not more than a predetermined amount may be determined as a "new object" that obstructs the execution of the parking control. From a similar viewpoint, a moving object that moves (goes back and forth) along a plurality of moving directions may be determined as a "new object" that obstructs the execution of the parking control.

The parking environmental factor which can be detected by the control device 10 changes every moment as the vehicle V1 moves, and a new object may therefore be detected on the first route after the start of execution of the first control instruction. In such a case, it may be difficult to move the vehicle V1 along the first route which has been previously set. When a new object is detected on the first route after the start of execution of the first control instruction, by making an inquiry to the operator M as to whether or not it is necessary to execute the second control, switching to the second control for leaving from the target parking space can be promptly executed.

(2) Second, the criterion for the control device 10 to determine that there is a change in the parking environmental factor can be defined by a situation in which "the position or size of the target parking space detected after the start of execution of the first control instruction changes by a predetermined value or more from the position or size of the target parking space detected earlier."

Figure 8A:
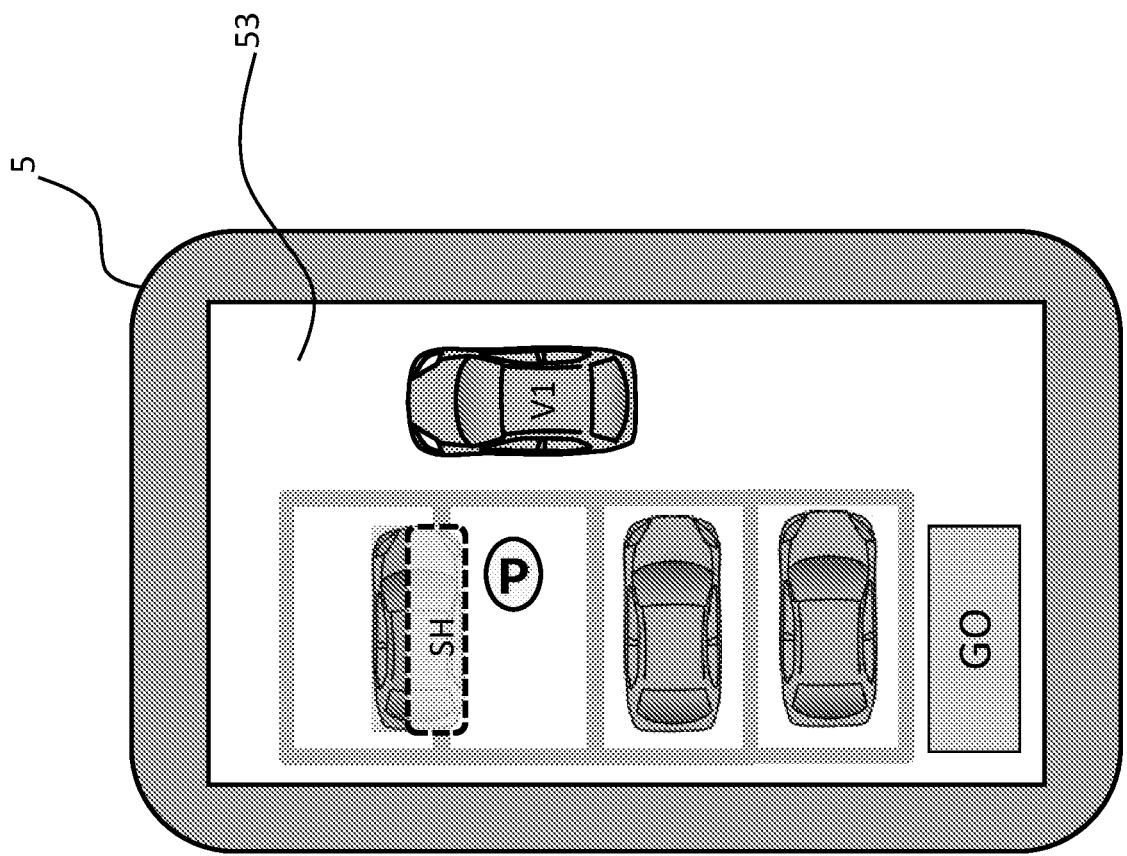
FIG. 8A is a diagram illustrating an example of third display information on a terminal device when executing first control.
Figure 8B:
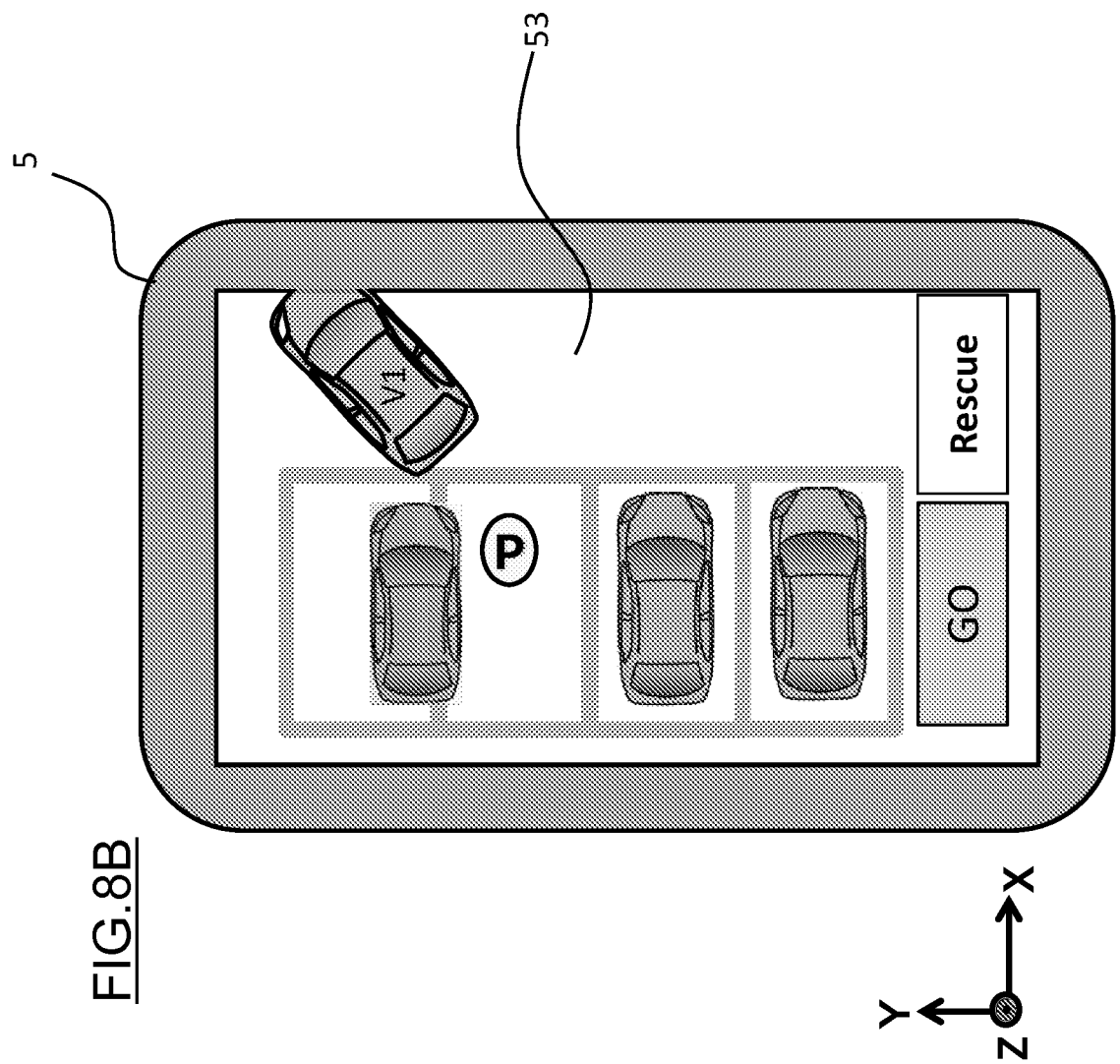
FIG. 8B is a diagram illustrating an example of third display information on a terminal device when executing second control.

FIG. 8A illustrates an example of the presentation information based on the detection result at the first timing around the start of the first control. A shadow area SH illustrated in FIG. 8A is not detected at the first timing, and the size of the target parking space indicated by a symbol P is detected as being wide (large). At the second timing after the first timing, the control device 10 detects all of the other vehicles as illustrated in FIG. 8B and recognizes that the size of the target parking space is narrower than the previous detection result. The control device 10 determines that the position or size of the target parking space detected after the start of execution of the first control instruction has changed by a predetermined value or more with respect to the position or size of the target parking space detected earlier and also determines that there is a change in the parking environmental factor. The control device 10 controls the display 53 of the operation terminal 5 to present the presentation information of FIG. 8B. The presentation information illustrated in FIG. 8B includes the parking space and other vehicles detected at the second timing and also includes a "Rescue" button for making an inquiry to the operator M as to whether or not it is necessary to execute the second control.

The detection environment changes as the vehicle V1 moves; therefore, the outline of another vehicle parked may not be accurately detected and/or the stall of a parking space may not be accurately detected. After the start of execution of the first control instruction, the position or size of the target parking space detected earlier may change. In such a case, it may be difficult to move the vehicle V1 along the first route to the target parking space which has been previously set. When a change in the position or size of the target parking space by a predetermined amount or more is detected after the start of execution of the first control instruction, by making an inquiry to the operator M as to whether or not it is necessary to execute the second control, switching to the second control for leaving from the target parking space can be promptly executed.

Additionally or alternatively, the criterion for the control device 10 to determine that there is a change in the parking environmental factor may be defined by a situation in which "the position or size of an object detected after the start of execution of the first control instruction changes by a predetermined value or more from the position or size of the object detected earlier." In this case, the control device 10 may make an inquiry to the operator M as to whether or not it is necessary to execute the second control for the vehicle to leave from the target parking space. The detection environment changes as the vehicle V1 moves; therefore, the position or size of an object may not be accurately detected. After the start of execution of the first control instruction, the position or size of an object detected earlier may change. In such a case, it may be difficult to move the vehicle V1 along the first route which has been previously set. When a change in the position or size of an object by a predetermined amount or more is detected after the start of execution of the first control instruction, by making an inquiry to the operator M as to whether or not it is necessary to execute the second control, switching to the second control for leaving from the target parking space can be promptly executed.

(3) Third, the criterion for the control device 10 to determine that there is a change in the parking environmental factor can be defined by a situation in which "a position M2 of the operator M detected after the start of execution of the first control instruction changes by a predetermined value or more from a position M1 of the operator M detected earlier."

Figure 9A:
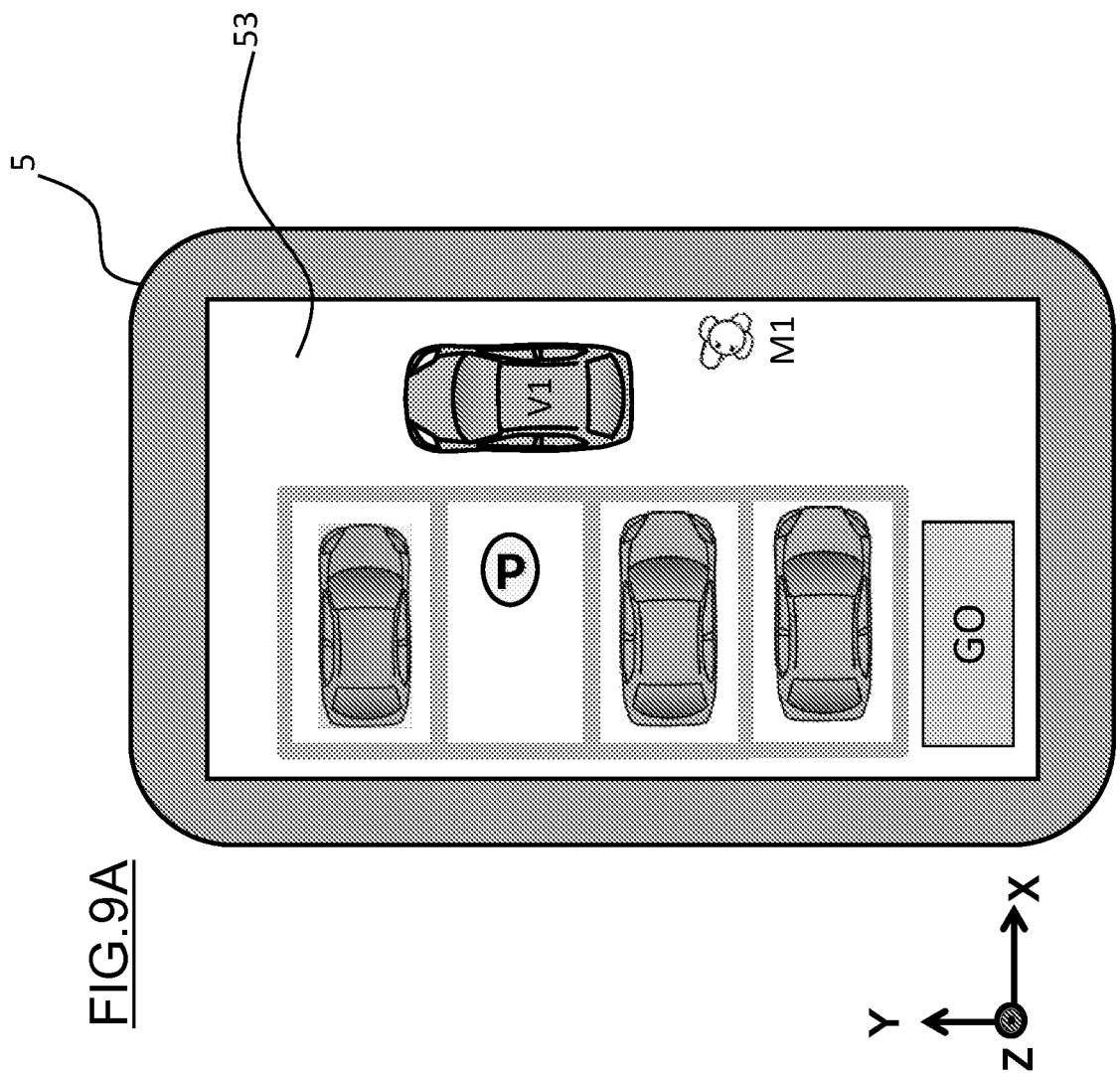
FIG. 9A is a diagram illustrating an example of fourth display information on a terminal device when executing first control.

FIG. 9A illustrates an example of the presentation information based on the detection result at the first timing around the start of the first control. The change between the position M1 of the operator M illustrated in FIG. 9A and the position M2 of the operator M illustrated in FIG. 9B is a predetermined value or more. The change in a position may be a change in the position in a predetermined direction (X-axis direction or Y-axis direction) or may also be a change in the distance in XY coordinates. The control device 10 determines that the position M2 of the operator M detected after the start of execution of the first control instruction has changed by a predetermined value or more with respect to the position M1 of the operator M detected earlier and also determines that there is a change in the parking environmental factor. Additionally or alternatively, the criterion for the control device 10 to determine that there is a change in the parking environmental factor may be defined by a situation in which "the position of the operator M is separated from the vehicle by a predetermined distance (e.g., 6 m)." This is because the operator M who performs remote control is made kept to be located near the vehicle as the target of control (within a predetermined distance).

As illustrated in FIG. 9B, the control device 10 controls the display 53 of the operation terminal 5 to present the presentation information. The presentation information illustrated in FIG. 9B includes the position of the operator M detected at the second timing and also includes a "Rescue" button for making an inquiry to the operator M as to whether or not it is necessary to execute the second control.

The operator M may move when the vehicle V1 moves. The position of the operator M detected after the start of execution of the first control instruction may change from the position of the operator M detected earlier. In such a case, it may be difficult to move the vehicle V1 along the first route which has been previously set. When a change in the position of the operator M by a predetermined amount or more is detected after the start of execution of the first control instruction, by making an inquiry to the operator M as to whether or not it is necessary to execute the second control, switching to the second control for leaving from the target parking space and moving to an evacuation space can be promptly executed. Thus, when the movement of the operator M by a predetermined distance or more is detected, a determination can be made that it is highly possible that the operator M takes notice of something and tries to confirm it. In such a case, it is possible to promptly confirm whether or not the second control can be executed, and the usability of the parking control system by remote operation can therefore be improved.

(4) Fourth, the criterion for the control device 10 to determine that there is a change in the parking environmental factor can be defined by a situation in which "an object detected after the start of execution of the first control instruction is not a moving object." This is based on an idea that a moving object such as a pedestrian does not obstruct the execution of the parking control once it passes and the parking environmental factor can therefore be treated as not changing.

Figure 10A:
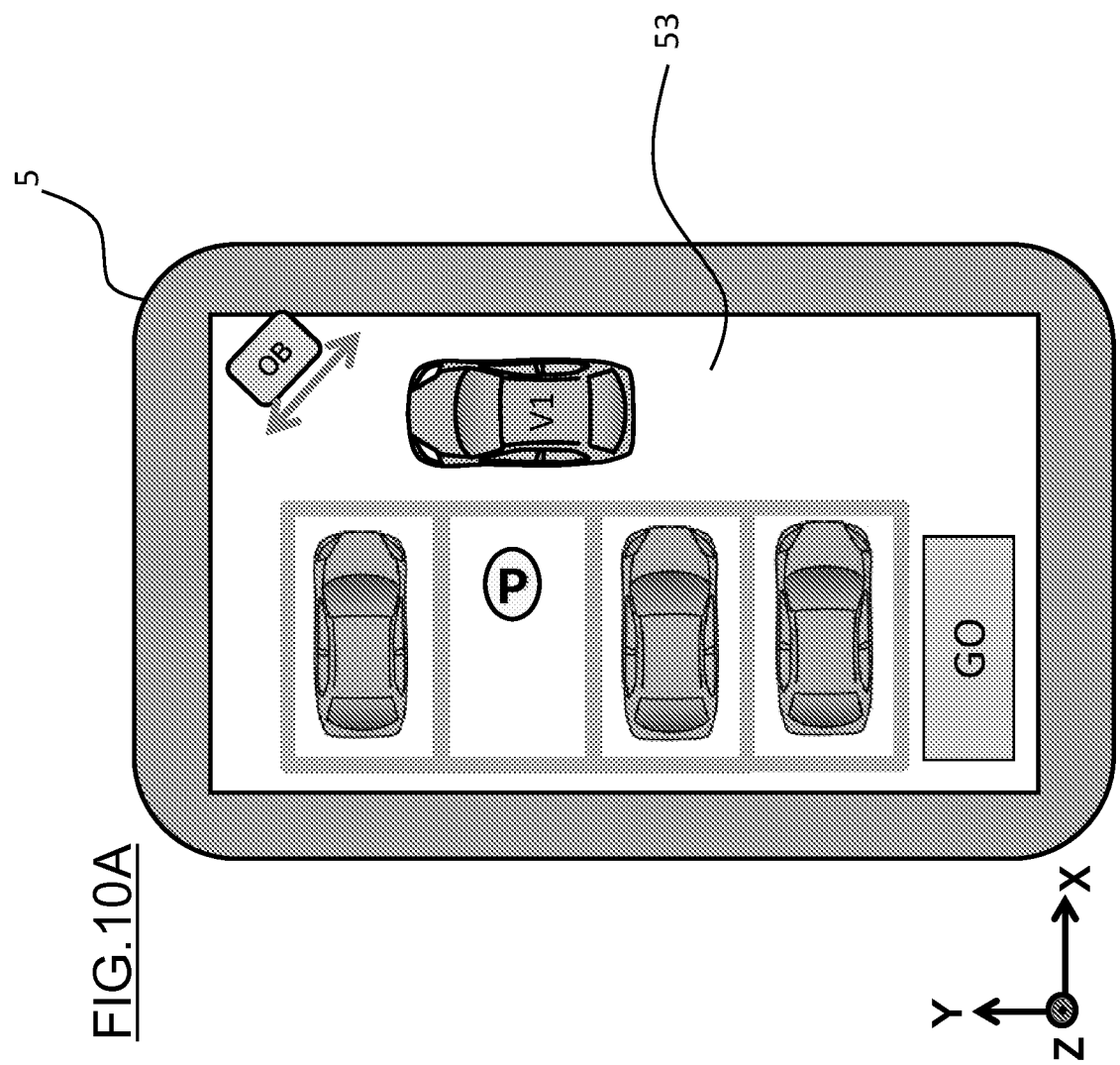
FIG. 10A is a diagram illustrating an example of fifth display information on a terminal device when executing first control.

FIG. 10A illustrates an example of the presentation information based on the detection result at the first timing around the start of the first control. As illustrated in FIG. 10A, an object OB is present ahead of the vehicle V1. On the basis of a change over time in the images captured by the cameras 1, a determination is made as to whether or not the object OB is a moving object (whether or not the object OB is a stationary object). When the object OB is a moving object, the object OB is a pedestrian or the like who merely passes and it is highly possible that the object OB moves away from the first route (parking route). In one or more embodiments of the present invention, when the detected object OB is not a moving object (or is a stationary object), a determination is made that there is a change in the parking environmental factor, and an inquiry is made to the operator M as to whether or not it is necessary to execute the second control.

A moving object that merely passes does not obstruct the execution of the parking control, but a moving object that comes to a stand or goes back and forth may obstruct the execution of the parking control. From the viewpoint that it is preferred to determine that there is "a change in the parking environmental factor" on the basis of a moving object that comes to a stand or goes back and forth, the "moving objects" in the above parking environmental factor may be limited to those moving at a speed (amount of change in the position) equal to or more than a predetermined value or those moving in a plurality of directions. That is, when an object moving at a speed less than a predetermined value or an object moving in a plurality of directions is detected, a determination is made that the object "is not a moving object (or is a stationary object)" and a determination is made that there is a change in the parking environmental factor.

When the object OB is a stationary object, an object moving at a speed equal to or less than a predetermined value, or an object moving in different moving directions, the position of the object OB detected at the second timing is displayed, and a "Rescue" button for making an inquiry to the operator M as to whether or not it is necessary to execute the second control is displayed.

Figure 10B:
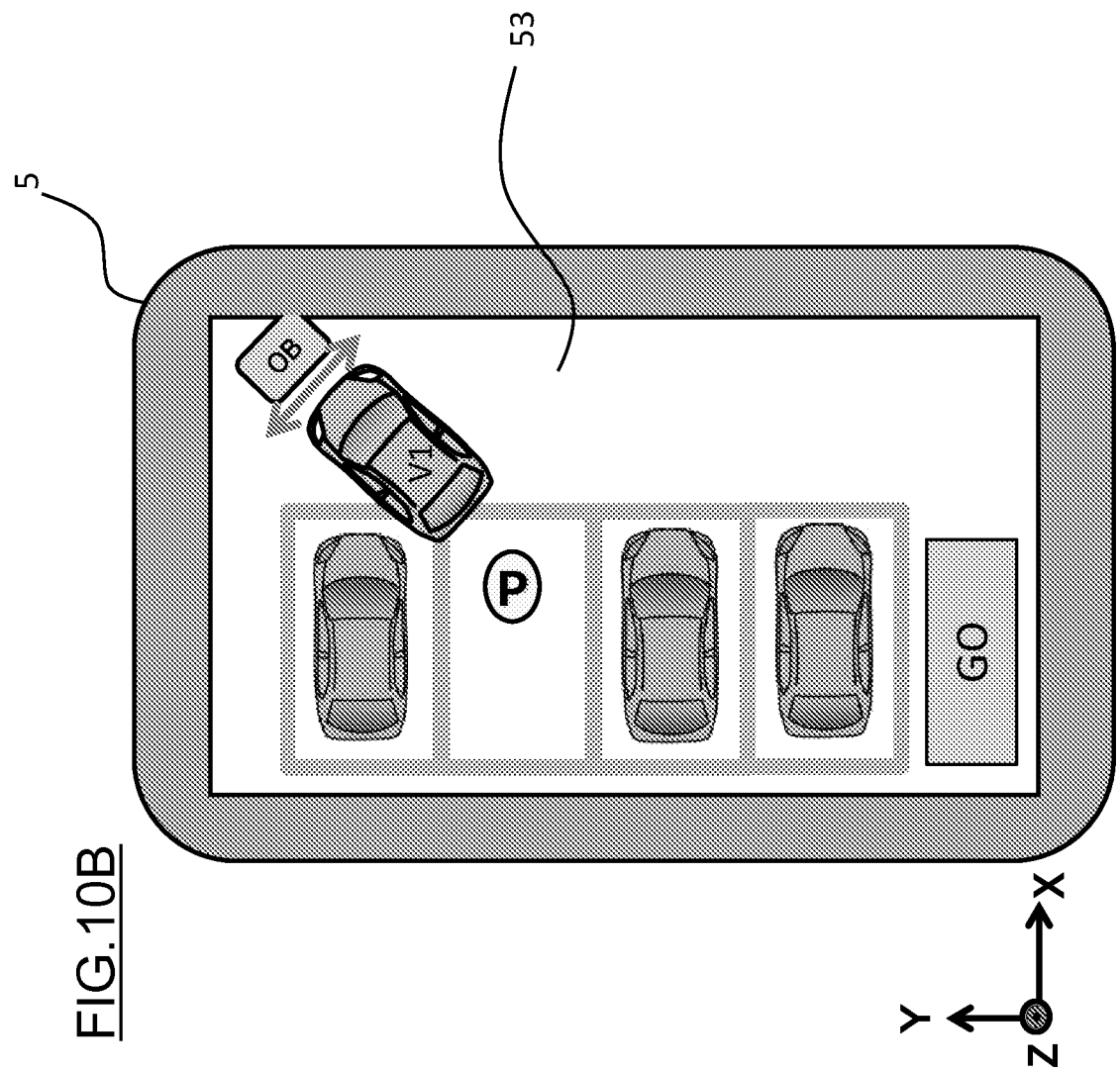
FIG. 10B is a diagram illustrating an example of fifth display information on a terminal device when executing second control.

Only when a stationary object that is highly likely to interfere with the first control is detected, an inquiry can be made as to whether or not it is necessary to execute the second control. When the detected object OB is a moving object, as illustrated in FIG. 10B, an inquiry is not made to the operator M as to whether or not it is necessary to execute the second control, and the operator can be prevented from feeling anxious and bothersome. When the detected object OB is a moving object, without making an inquiry as to whether or not it is necessary to execute the second control, while when the detected object OB is a stationary object, by making an inquiry as to whether or not it is necessary to execute the second control, switching to the second control can be promptly executed without causing the operator M to feel anxious and bothersome.

Additionally or alternatively, the criterion for the control device 10 to determine that there is a change in the parking environmental factor can be defined by a situation in which an object detected after the start of execution of the first control instruction is an obstacle that obstructs the movement of the vehicle. In other words, the criterion for determining that there is a change in the parking environmental factor can be defined by a situation in which an object detected after the start of execution of the first control instruction is not a non-obstacle that does not obstruct the movement of the vehicle. As previously described, the non-obstacle in one or more embodiments of the present invention is an object that does not obstruct the travel of the vehicle V, such as a moving object, an object having a height of 20 cm or less, an object having a height of 10 cm or less, garbage, a step having a level difference of 20 cm or less, a step having a level difference of 10 cm or less, a fallen leaf, or grass. Even when an object that does not obstruct the travel is newly detected, a determination is made that there is no change in the parking environmental factor.

Even when an object OB is detected, the object OB may possibly be a non-obstacle that does not obstruct the movement of the vehicle. If an inquiry about switching to the second control is made for a non-obstacle, the inquiry may cause the operator M to feel anxious and bothersome. When the object OB has an attribute that is classified as a non-obstacle, the control device 10 does not make an inquiry to the operator M about the switching to the second control. When the object OB is a non-obstacle, an inquiry is not made to the operator M as to whether or not it is necessary to execute the second control, and the operator can be prevented from feeling anxious and bothersome. When the detected object OB is a non-obstacle, without making an inquiry as to whether or not it is necessary to execute the second control, while when the detected object OB is an obstacle (is not a non-obstacle), by making an inquiry as to whether or not it is necessary to execute the second control, switching to the second control can be promptly executed without causing the operator M to feel anxious and bothersome.

In step 111, the control device 10 determines whether or not an execution instruction for the second control is input. When the operator who finds the presentation information of the above-described inquiry about switching to the second control presses or touches the "Rescue" button, the control device 10 determines that the execution instruction for the second control is input, and the process proceeds to step 112.

In step 111, the control device 10 may receive the execution instruction for the second control from the operator M and determine whether or not the first control can be continued and whether or not the execution of the first control should be suspended/canceled rather than only receiving the execution instruction for the second control. The control device 10 determines whether or not the vehicle can move to the target parking space. When the execution of the first control is started, the control device 10 acquires detection information of surrounding objects (obstacles) at a predetermined cycle and determines whether or not the vehicle V1 can travel along the first route. When the execution of the first control is started, the control device 10 acquires detection information of the target parking space at a predetermined cycle and determines whether or not the vehicle V1 can enter the target parking space. The control device 10 determines whether or not the vehicle V1 can travel along the first route without being obstructed by an object. When travel along the first route is not possible, the control device 10 determines that the execution of the first control should be suspended or canceled. In this case, the process of the control device 10 may proceed to step 112 before receiving the execution instruction for the second control. The control device 10 may suspend or cancel the execution of the first control and execute the process of switching to the second control.

In step 112, the control device 10 may suspend or cancel the first control, and the process proceeds to step 113, in which the control device 10 may execute the process of switching to the second control. The control device 10 performs a process of calculating the second route illustrated in step 113 parallel to the process of step 112 or before or after the process of step 112. The second route is a route for the vehicle V1 to leave from the target parking space (a route for separating the vehicle V1 from the target parking space), (a route for making a space between the vehicle V1 and target parking space), (a route for making the vehicle V1 escape from the target parking space). The second route in one or more embodiments of the present invention is used in a rescue mode (return mode) for return/recovery from the state in which the parking control is suspended/canceled. The rescue mode refers to a process that is executed as emergency avoidance when continuation of the parking control process is difficult and the movement to the target parking position is suspended/canceled. The rescue mode is a process of moving the subject vehicle V1 so as to make the subject vehicle V1 leave from the target parking space (so as to separate the subject vehicle V1 from the target parking space), (so that the subject vehicle V1 is/becomes distant from the target parking space), (so that the subject vehicle V1 escapes from the target parking space) which has been set before the execution of the rescue mode. The control device 10 may calculate a trajectory for avoiding an object that causes the movement to the target parking position to be suspended/canceled, as the second route (route in the rescue mode). As will be understood, the second route may be the same as the first route to the target parking space, and the control device 10 may reverse the travel direction along the route to calculate the second route for moving the subject vehicle V1 in the opposite direction to the first route. The second route calculated in the rescue mode may be a trajectory for moving (returning) to the position at which the parking process was started.

When calculating the second route, in step 114, the control device 10 sets an evacuation space. In one or more embodiments of the present invention, the control device 10 may set the evacuation space at a position separated from the object by a predetermined distance or more and calculate the second route to the set evacuation space. The second route is obtained after setting the evacuation space, and the vehicle V1 can therefore be guided to a position separated from the object by a predetermined distance or more.

Step 114 is followed by step 115, in which the control device 10 generates the second control instruction for moving the vehicle V along the calculated second route. The control device 10 preliminarily stores the spec information of the vehicle V necessary for calculation of the control instruction. Examples of the second control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The second control instruction includes the execution timing or execution position of the above operation instruction for the vehicle V. The instruction regarding the parking route and the operation instruction associated with the parking route are executed by the vehicle V, and the vehicle V can thereby be moved (parked) to the target parking position. When the execution command for the second control is input, the control device 10 executes a process of moving the subject vehicle V1 along the second route for leaving from the target parking space. The moving direction and moving distance on the trajectory for leaving from the target parking space are not limited.

Referring again to FIG. 4, in step S116, the control device 10 executes the second control on the basis of the second control instruction. In this way, when the execution command for the second control is input from the operator M, the control device 10 according to one or more embodiments of the present invention suspends or cancels the execution of the first control instruction, calculates the second route for the vehicle V1 to leave from the target parking space to a further extent than a previous state, generates or acquires the second control instruction for moving the vehicle along the second route, and executes the second control instruction. Thus, when the parking environmental factor changes, the second control instruction (rescue mode) can be promptly executed in accordance with the intention of the operator M. After the second control is completed, the vehicle V1 is controlled to move to the evacuation space. The evacuation space is not a parking space and it is therefore necessary to move the vehicle V1 to a parking space.

In step 117, when the execution instruction for the first control for moving the vehicle to the target parking space is input again, the processes of step 118 and subsequent steps are performed to move the vehicle to the target parking space again.

In step 118, the control device 10 detects objects around the vehicle V1. In step 119, the control device 10 sets a target parking space again. In step 119, the control device 10 calculates the parking route (first route) to the target parking space. The parking route includes a position of turn for parking necessary for moving to the parking space. For this operation, the parking route is defined as a line and is also defined as a strip-shaped area corresponding to the occupied area by the vehicle V based on the vehicle width. The occupied area by the vehicle V is defined with consideration for the vehicle width and a margin width ensured for movement. The control device 10 confirms that no objects are detected within the occupied area.

In step 120, the control device 10 generates a control instruction for moving the vehicle V along the calculated parking route. The control device 10 preliminarily stores the spec information of the vehicle V necessary for the control instruction. Examples of the control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The control instruction includes the execution timing or execution position of the above operation instruction for the vehicle V. The instruction regarding the parking route and the operation instruction associated with the parking route are executed by the vehicle V, and the vehicle V can thereby be moved (parked) to the target parking position. The control instruction according to one or more embodiments of the present invention includes a stop instruction for the vehicle V at the second position. Additionally or alternatively, the control instruction may include an operation of opening a door of the vehicle V at the second position.

In step 121, the control device 10 monitors the change in the environment around the vehicle V until the vehicle V reaches the position of turn for parking. When the vehicle V reaches the position of turn for parking, the gear shift included in the control instruction is executed in step 122. Step 122 is followed by step 123, in which the parking control is completed by sequentially executing control instructions.

The parking control apparatus 100 according to one or more embodiments of the present invention controls the operation of the drive system 40 via the vehicle controller 70 in accordance with the control instruction so that the vehicle V moves along the parking route. The parking control apparatus 100 calculates command signals to the drive system 40 of the vehicle V, such as an EPS motor, while feeding back the output value of the steering angle sensor 50 of the steering apparatus so that the travel trajectory of the vehicle V coincides with the calculated parking route, and transmits the command signals to the drive system 40 or to the vehicle controller 70 which controls the drive system 40.

The parking control apparatus 100 according to one or more embodiments of the present invention includes a control unit for parking control. The control unit for parking control acquires shift range information from an AT/CVT control unit, wheel speed information from an ABS control unit, steering angle information from a steering angle control unit, engine speed information from an ECM, and other necessary information. On the basis of these information items, the control unit for parking control calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V, the vehicle speed sensor 60, and other sensors of the vehicle V, via the vehicle controller 70.

The drive system 40 according to one or more embodiments of the present invention drives the vehicle V1 to move (travel) from the current position to the target parking position by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V to the target parking position. The control content and operation scheme for parking of the vehicle V are not particularly limited, and any scheme known at the time of filing the present application can be appropriately applied.

When the parking control apparatus 100 according to one or more embodiments of the present invention controls the vehicle V to move to the target parking position along the route calculated on the basis of the position of the vehicle V and the position of the target parking position, the accelerator and the brake are controlled in an autonomous manner on the basis of the designated control vehicle speed (set vehicle speed), and the operation of the steering apparatus controls the movement of the vehicle V in an autonomous manner in accordance with the vehicle speed.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, when a change in the parking environmental factor, such as detection of an object, is detected around the vehicle, an inquiry is made to the operator as to whether or not it is necessary to execute the second control for the vehicle to leave from the target parking space without unexceptionally/uniformly stopping the vehicle and, therefore, transition to the second control can be promptly executed in response to the change in the parking environmental factor.

(2) In the parking control method according to one or more embodiments of the present invention, when the execution command for the second control is input from the operator M, the control device 10 according to one or more embodiments of the present invention suspends or cancels the execution of the first control instruction, calculates the second route for the vehicle V1 to leave from the target parking space, generates or acquires the second control instruction for moving the vehicle along the second route, and executes the second control instruction. Thus, when the parking environmental factor changes, the second control instruction (rescue mode) can be promptly executed in accordance with the intention of the operator M.

(3) In the parking control method according to one or more embodiments of the present invention, upon the comparison between the first parking environmental factor of the vehicle detected at the time of starting the execution of the first control instruction and the second parking environmental factor of the vehicle detected after starting the execution of the first control instruction, when the amount of change between a first evaluation value of the first parking environmental factor and a second evaluation value of the second parking environmental factor is not less than a predetermined value, the control device 10 determines that there is a change in the parking environmental factor. By quantitatively determining whether or not there is a change in the parking environmental factor on the basis of the amount of change between the first evaluation value of the first parking environmental factor and the second evaluation value of the second parking environmental factor, the timing of an inquiry about the execution of the second control can be determined accurately and appropriately.

(4) In the parking control method according to one or more embodiments of the present invention, when a new object is detected on the first route after the start of execution of the first control instruction, an inquiry can be made to the operator M as to whether or not it is necessary to execute the second control. The parking environmental factor which can be detected by the control device 10 changes every moment as the vehicle V1 moves, and a new object may therefore be detected on the first route after the start of execution of the first control instruction. In such a case, it may be difficult to move the vehicle V1 along the first route which has been previously set. When a new object is detected on the first route, by making an inquiry to the operator M as to whether or not it is necessary to execute the second control, switching to the second control for leaving from the target parking space can be promptly executed.

(5) In the parking control method according to one or more embodiments of the present invention, when a change of a predetermined amount or more is detected in the position or size of the target parking space after the start of execution of the first control instruction, an inquiry can be made to the operator M as to whether or not it is necessary to execute the second control. The detection environment changes as the vehicle V1 moves; therefore, the outline of another vehicle parked may not be accurately detected, the stall of a parking space may not be accurately detected, and/or the position or size of the target parking space detected earlier may change after the start of execution of the first control instruction. In such a case, it may be difficult to move the vehicle V1 along the first route to the target parking space which has been previously set. When a change in the position or size of the target parking space by a predetermined amount or more is detected after the start of execution of the first control instruction, by making an inquiry to the operator M as to whether or not it is necessary to execute the second control, switching to the second control for leaving from the target parking space can be promptly executed.

(6) In the parking control method according to one or more embodiments of the present invention, when a change of a predetermined amount or more is detected in the position or size of an object after the start of execution of the first control instruction, an inquiry can be made to the operator M as to whether or not it is necessary to execute the second control. The detection environment changes as the vehicle V1 moves; therefore, the position or size of an object may not be accurately detected. After the start of execution of the first control instruction, the position or size of an object detected earlier may change. In such a case, it may be difficult to move the vehicle V1 along the first route which has been previously set. When a change in the position or size of an object by a predetermined amount or more is detected after the start of execution of the first control instruction, by making an inquiry to the operator M as to whether or not it is necessary to execute the second control, switching to the second control for leaving from the target parking space can be promptly executed.

(7) In the parking control method according to one or more embodiments of the present invention, when a change of a predetermined amount or more is detected in the position of the operator M, an inquiry can be made to the operator M as to whether or not it is necessary to execute the second control. The operator M may move when the vehicle V1 moves. The position of the operator M detected after the start of execution of the first control instruction may change from the position of the operator M detected earlier. In such a case, it may be difficult to move the vehicle V1 along the first route which has been previously set. When a change in the position of the operator M by a predetermined amount or more is detected after the start of execution of the first control instruction, by making an inquiry to the operator M as to whether or not it is necessary to execute the second control, switching to the second control for leaving from the target parking space can be promptly executed. When the movement of the operator M by a predetermined distance or more is detected, a determination can be made that it is highly possible that the operator M takes notice of something and tries to confirm it. In such a case, it is possible to promptly confirm whether or not the second control can be executed, and the usability of the parking control system by remote operation can therefore be improved.

(8) In the parking control method according to one or more embodiments of the present invention, only when a stationary object that is highly likely to interfere with the first control is detected, an inquiry can be made as to whether or not it is necessary to execute the second control. When the detected object OB is a moving object, an inquiry is not made to the operator M as to whether or not it is necessary to execute the second control, and the operator can be prevented from feeling bothersome. When the detected object OB is a moving object, without making an inquiry as to whether or not it is necessary to execute the second control, while when the detected object OB is a stationary object, by making an inquiry as to whether or not it is necessary to execute the second control, switching to the second control can be promptly executed without causing the operator M to feel bothersome. (9) In the parking control method according to one or more embodiments of the present invention, when the object OB has an attribute that is classified as a non-obstacle, it is possible not to make an inquiry about the switching to the second control. Even when an object OB is detected, the object OB may possibly be a non-obstacle that does not obstruct the movement of the vehicle. If an inquiry about switching to the second control is made for a non-obstacle, the inquiry may cause the operator M to feel bothersome. In one or more embodiments of the present invention, when the object OB has an attribute that is classified as a non-obstacle, an inquiry is not made to the operator M about the switching to the second control. When the object OB is a non-obstacle, an inquiry is not made to the operator M as to whether or not it is necessary to execute the second control, and the operator can be prevented from feeling bothersome. When the detected object OB is a non-obstacle, without making an inquiry as to whether or not it is necessary to execute the second control, while when the detected object OB is an obstacle (is not a non-obstacle), by making an inquiry as to whether or not it is necessary to execute the second control, switching to the second control can be promptly executed without causing the operator M to feel bothersome.

(10) In the parking control method according to one or more embodiments of the present invention, when there is a change in the parking environmental factor, the display inquiring about an input of the execution command for the second control instruction is presented on the operation terminal 5 capable of communication, and it is therefore possible to promptly confirm the intention of the operator M regarding the switching to the second control for leaving from the target parking space and also promptly execute the second control.

(11) Also in the parking control apparatus 100 in which the method according to one or more embodiments of the present invention is executed, the actions and effects as described in the above (1) to (10) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device 11 CPU
12 ROM
13 RAM
132 Storage device
133 Map information
134 Parking lot information
135 Object information
20 Input device
21 Communication device
211 Antennas
30 Output device
31 Display
1a-1d Cameras
2 Ranging devices
3 Information server
31 Communication device
32 Storage device
33 Map information
34 Parking lot information
35 Object information
5 Operation terminal
51 Communication device
511 Antenna
52 Input device
53 Display
200 Onboard device
40 Drive system
50 Steering angle sensor
60 Vehicle speed sensor
70 Vehicle controller
V, V1 Vehicle

The invention claimed is:

1. A parking control method for causing a control device of a vehicle to execute a first control instruction on a basis of an operation command acquired from an operator, the first control instruction being for moving the vehicle along a first route to a target parking space, the parking control method comprising:
when there is a change in a parking environmental factor of the vehicle detected after start of execution of the first control instruction with respect to the parking environmental factor of the vehicle detected prior to the start of execution of the first control instruction, suspending or canceling execution of the first control instruction; and
making an inquiry to the operator as to whether or not it is necessary to execute a second control instruction for moving the vehicle so that the vehicle leaves from the target parking space to a further extent than a state when the first control instruction is suspended or canceled.

2. The parking control method according to claim 1, comprising:
suspending or canceling execution of the first control instruction when an execution command for second control is input from the operator;
calculating a second route for the vehicle to leave from the target parking space;
generating or acquiring the second control instruction for moving the vehicle along the second route; and
causing the control device to execute the second control instruction.

3. The parking control method according to claim 1, comprising:
comparing a first parking environmental factor of the vehicle detected prior to the start of execution of the first control instruction with a second parking environmental factor of the vehicle detected after the start of execution of the first control instruction; and
when an amount of change between a first evaluation value of the first parking environmental factor and a second evaluation value of the second parking environmental factor is a predetermined value or more, determining that there is a change in the parking environmental factor.

4. The parking control method according to claim 1, comprising:
when an object is detected on the first route after the start of execution of the first control instruction, determining that there is a change in the parking environmental factor.

5. The parking control method according to claim 1, comprising:
when a position or size of the target parking space detected after the start of execution of the first control instruction changes from the position or size of the target parking space detected earlier, determining that there is a change in the parking environmental factor.

6. The parking control method according to claim 1, comprising:
when a position or size of an object detected after the start of execution of the first control instruction changes from the position or size of the object detected earlier, determining that there is a change in the parking environmental factor.

7. The parking control method according to claim 1, comprising:
when a position of the operator detected after the start of execution of the first control instruction changes from the position of the operator detected earlier, determining that there is a change in the parking environmental factor.

8. The parking control method according to claim 1, comprising:
when an object detected after the start of execution of the first control instruction is not a moving object, determining that there is a change in the parking environmental factor.

9. The parking control method according to claim 1, comprising:
when an object detected after the start of execution of the first control instruction is an obstacle that obstructs movement of the vehicle, determining that there is a change in the parking environmental factor.

10. The parking control method according to claim 1, comprising:
when there is a change in the parking environmental factor, presenting a display to inquire about an input of an execution command for the second control instruction on an operation terminal capable of communication.

11. A parking control apparatus comprising a control device configured to execute a first control instruction on a basis of an operation command acquired from an operator, the first control instruction being for moving a vehicle along a first route to a target parking space, the control device operating to:
when there is a change in a parking environmental factor of the vehicle detected after start of execution of the first control instruction with respect to the parking environmental factor of the vehicle detected prior to the start of execution of the first control instruction, suspend or cancel execution of the first control instruction; and make an inquiry to the operator as to whether or not it is necessary to execute a second control instruction for moving the vehicle so that the vehicle leaves from the target parking space to a further extent than a state when the first control instruction is suspended or canceled.

* * * * *